(12) United States Patent
Dinnean

(10) Patent No.: US 12,128,329 B1
(45) Date of Patent: Oct. 29, 2024

(54) SOLID PHASE EXTRACTION DISK

(71) Applicant: Kevin Dinnean, Webster, NH (US)

(72) Inventor: Kevin Dinnean, Webster, NH (US)

( * ) Notice: Subject to any disclaimer, the term of this patent is extended or adjusted under 35 U.S.C. 154(b) by 0 days.

(21) Appl. No.: 17/673,738

(22) Filed: Feb. 16, 2022

Related U.S. Application Data

(60) Provisional application No. 63/149,699, filed on Feb. 16, 2021.

(51) Int. Cl.
 *B01D 15/10* (2006.01)
 *B01D 39/20* (2006.01)
 *G01N 1/34* (2006.01)

(52) U.S. Cl.
 CPC ......... *B01D 15/10* (2013.01); *B01D 39/2017* (2013.01); *G01N 1/34* (2013.01); *B01D 2239/0407* (2013.01); *B01D 2239/0618* (2013.01); *B01D 2239/065* (2013.01); *B01D 2239/069* (2013.01)

(58) Field of Classification Search
 None
 See application file for complete search history.

(56) References Cited

U.S. PATENT DOCUMENTS

| | | | |
|---|---|---|---|
| 6,027,638 A | 2/2000 | Johnson | |
| 8,528,747 B2 * | 9/2013 | Dinnean | G01N 1/405 210/503 |
| 10,422,730 B2 | 9/2019 | Vitella et al. | |
| 2010/0038303 A1 * | 2/2010 | Cai | B01D 29/085 210/406 |
| 2010/0200491 A1 * | 8/2010 | Dinnean | B01J 20/3242 210/315 |
| 2014/0097139 A1 | 4/2014 | Johnson | |
| 2022/0331795 A1 | 10/2022 | Dinnean | |

OTHER PUBLICATIONS

Jones, W. et al. "The Role of the Carbon Cartridge in the One-Pass System," Biotage, 2019, 1-8.
Resprep, "Eliminate Cross-Contamination with New Resprep Quick-Replace Vacuum Manifolds," Lit Cat No. GNSS3137A-UNV, 2021, 1-4.

* cited by examiner

*Primary Examiner* — Jason M Greene
*Assistant Examiner* — Eric J McCullough
(74) *Attorney, Agent, or Firm* — COOLEY LLP

(57) ABSTRACT

Solid phase extraction (SPE) disks are manufactured by introducing a series of components and/or liquid suspensions into a mold and evacuating the liquid to form a cohesive filter or SPE disk. After all the free liquid has been substantially removed, the SPE disk is removed from the mold and dried. SPE disks are for use in analytical chemistry procedures.

17 Claims, 18 Drawing Sheets

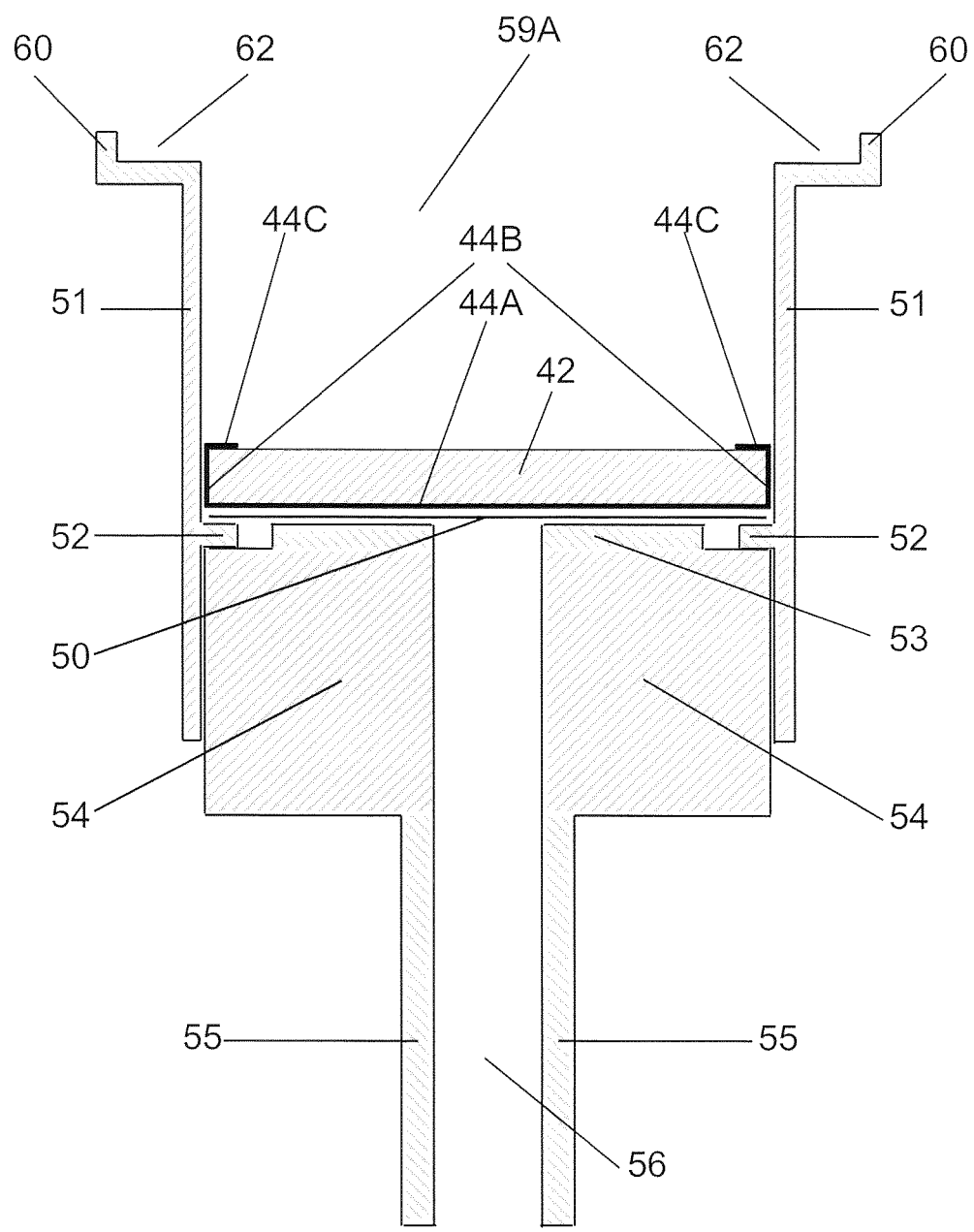

SOLID PHASE EXTRACTION DISK

RELATED APPLICATION

This application claims priority to provisional patent application U.S. Ser. No. 63/149,699 filed on Feb. 16, 2021, the entire contents of which is herein incorporated by reference.

BACKGROUND

The embodiments herein relate generally to sample testing products and techniques, and more particularly to improved solid phase extraction (SPE) filtration disks and methods for their manufacture.

SPE involves removing minor chemical constituents from a sample of water or other liquid. This was generally done for two purposes. The first of these two purposes for employing solid phase extraction was to capture the method analytes (the chemicals a given SPE procedure seeks to isolate) on the SPE disk for the purpose of identifying the specific chemicals present and determining their concentration in the original water or other liquid sample. The second of these two purposes was to remove or isolate the chemical constituents that were not analytes of the testing procedure being employed. These chemical constituents were removed because they could interfere with the accurate identification or quantification of the method analytes. The chemical identity and concentration of the chemical constituents removed as interferents by the solid phase extraction process were not determined. It was possible for a procedure to employ both processes described. An SPE procedure was usually followed by a determinative technique to identify the specific chemical identity and concentration of the method analytes. These determinative techniques included gas chromatography, liquid chromatography, mass spectrometry, and optical (or light absorption) techniques.

SUMMARY

The solid phase extraction disks of this invention are layered with a piece of glass fiber mesh or filter paper forming the bottom layer, a glass fiber and sorbent layer in forming the middle layer, and a glass fiber layer forming the top layer. The glass fiber mesh or filter paper forming the bottom layer or circular surface is folded much like a pleated coffee filter and extends part or all the way up the cylindrical side of the middle glass fiber and sorbent layer in one embodiment. In a second embodiment the glass fiber mesh or filter paper forming the bottom layer or circular surface is folded and extends all the way up the cylindrical side of the glass fiber and sorbent(s) layer and part or all the way up the cylindrical side of the top glass fiber layer. In a third embodiment the glass fiber mesh or filter paper forming the bottom layer or circular surface is folded and extends all the way up the cylindrical side of the glass fiber and sorbent(s) layer and extends in between the glass fiber and sorbent layer and the top glass fiber layer. The folding of the piece of glass fiber mesh or filter paper to form part or all of the cylindrical side of the SPE disk in all three of these embodiments aids in the structural integrity of the solid phase extraction disk. These disk constructions also serve to encapsulate the sorbent in the glass fiber and sorbent layer preventing the solid phase extraction disk from shedding loose particles of sorbent.

BRIEF DESCRIPTION OF THE FIGURES

The detailed description of some embodiments of the invention is made below with reference to the accompanying figures, wherein like numerals represent corresponding parts of the figures.

FIG. 14 shows a section view of one embodiment of the present invention;

SUMMARY OF NUMBERED COMPONENTS

Figure 1:
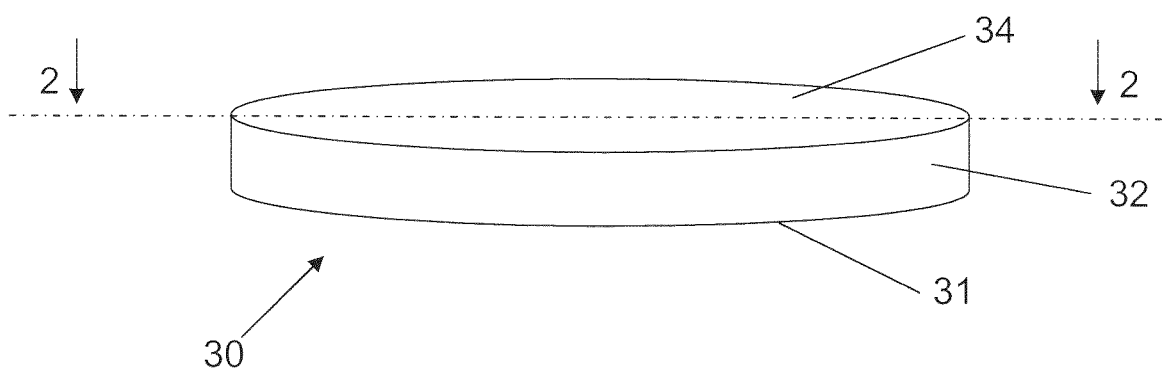
FIG. 1 shows a perspective view of one embodiment of the present invention.

30 SPE disk
31 SPE disk circular bottom surface
32 SPE disk cylindrical side surface
34 SPE disk circular top surface
37 Sorbent, particles of silica or polymer that may have surface modifications
40 Top layer of wet laid glass fiber of SPE disk
42 Sorbent and glass fiber layer of SPE disk containing wet laid glass fiber and a sorbent or sorbents
44 Glass fiber mesh or filter paper (the same numeral is used to refer to the glass fiber mesh or filter paper both as a raw material and as a component of a finished SPE disk) Glass fiber mesh or filter paper is not wet laid 44A Center circular section of glass fiber mesh or filter paper that forms the base or bottom circular surface of the SPE disk 44B Outer ring shaped section of glass fiber mesh or filter paper that forms part or all of the cylindrical side of the SPE disk 44C Outermost ring shaped section of glass fiber mesh or glass paper that is folded on top of the sorbent and glass fiber layer and covered by the top layer of glass fiber 50 Screen or other porous material that is placed in the upper cavity of the disk forming mold and rests on the disk mold base 51 Disk forming mold 52 Circular projection or support shelf on the interior cylindrical surface of the disk forming mold 53 Cylindrical projection on the top of the disk forming mold plug 54 Disk forming mold plug 54A O-ring groove on the exterior cylindrical surface of the disk forming mold plug 54B O-ring used to establish a seal between the disk forming mold plug and the disk forming mold 55 Connecting pipe 56 Passageway used to provide vacuum to facilitate the removal of fluids during the disk manufacturing process 57 Vacuum manifold 58 Cylindrical tool for inserting glass fiber mesh or filter paper into upper cavity of disk forming mold and for folding outermost section of glass fiber filter paper 58A Blunt end of cylindrical tool 58B Angled end of cylindrical tool 58C Stop on cylindrical tool to limit the depth the angled end is inserted into the upper cavity of the disk forming mold 59A Cavity in upper portion of disk forming mold above the support shelf 59B Cavity in lower portion of disk forming mold below the support shelf 60 Enlarged upper section of disk forming mold 62 Recess in enlarged upper section of disk forming mold to aid in centering the glass fiber mesh or filter paper over the upper cavity in the disk forming mold, More than one concentric recess may be present to accommodate filter papers of different diameters.

70 Disk mold base, surface created when disk forming mold plug is inserted into lower cavity of disk forming mold and on which the screen rests during SPE disk fabrication 70A Upper shelf surface of shelf located on the interior cylindrical surface of the disk forming mold which forms part of the disk mold base 70B Upper plug surface of the cylindrical projection on the disk forming mold plug which forms part of the disk mold base and on which radial and circular aspiration grooves are located 72 Radial aspiration grooves located on the top circular surface of the cylindrical projection on the disk forming mold plug 74 Circular aspiration grooves located on the top circular surface of the cylindrical projection on the disk forming mold plug 74A Gap in between the circular projection or shelf on the interior cylindrical surface of the disk forming mold and the outside cylindrical surface of the cylindrical projection on the disk forming mold plug, created when the disk forming mold plug is inserted into the lower cavity of the disk forming mold and serving as a circular aspiration groove to distribute vacuum under the screen

DETAILED DESCRIPTION OF CERTAIN EMBODIMENTS

By way of example, and referring to FIG. 1, FIG. 1 Shows a perspective view of SPE disk 30 with circular bottom surface 31, cylindrical side 32 and circular top surface 34.

Figure 2:
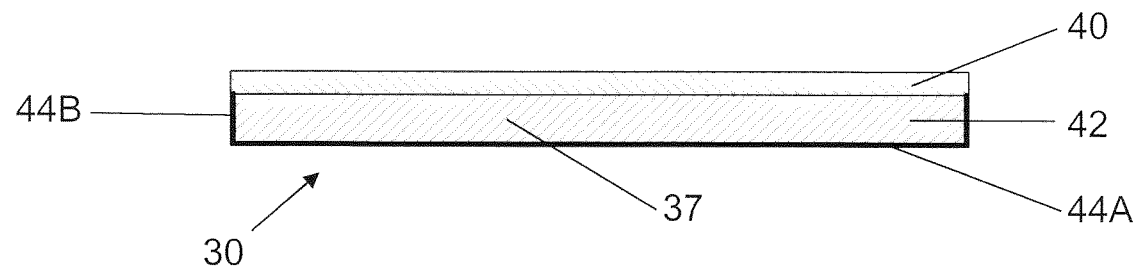
FIG. 2 shows a section view of one embodiment of the present invention taken along line 1-1 in FIG. 1.

FIG. 2 shows a cross section of an example of SPE Disk 30 constructed of glass fiber mesh or filter paper 44, wet laid glass fiber and sorbent(s) 37. Filter paper 44 is folded much like a pleated coffee filter. Filter paper center section 44A forms bottom circular surface 31 of SPE disk 30. Filter paper outer section 44B extends partway up side 32 of SPE disk 30 forming the lower portion of side 32. Glass fiber and sorbent layer 42 is formed on top of filter paper center section 44A and within outer section 44B of filter paper 44. Filter paper outer section 44B extends up side 32 to the top of glass fiber and sorbent layer 42. Wet laid glass fiber layer 40 is formed on top of glass fiber and sorbent layer 42 and forms top surface 34 and the upper section of side 32 of SPE disk 30.

Figure 2A:
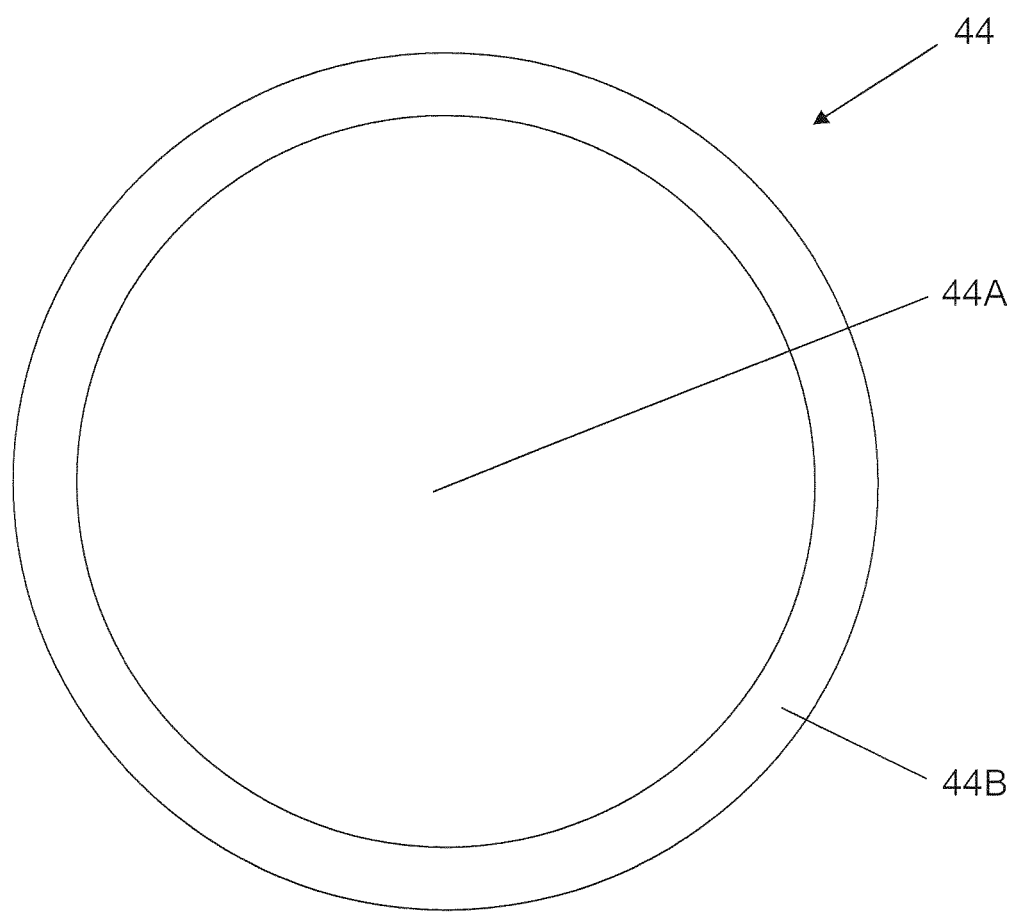
FIG. 2A shows a top view of one embodiment of the present invention.

FIG. 2A shows glass fiber mesh or filter paper 44 with the center circular section 44A and outer ring section 44B. When incorporated into SPE disk 30 as depicted in FIG. 2 center circular section 44A forms base 31, outer ring section 44B forms the lower portion of side 32 of SPE disk 30 as shown in FIG. 2.

Figure 3:
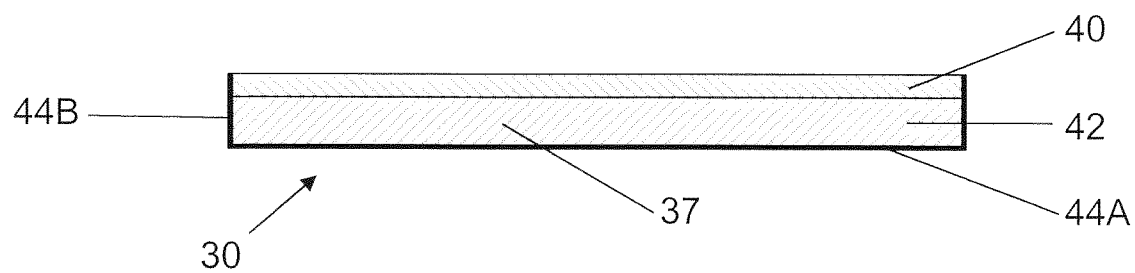
FIG. 3 shows a section view of one embodiment of the present invention.

FIG. 3 shows a cross section of an example of SPE Disk 30 constructed of glass fiber mesh or filter paper 44, wet laid glass fiber and sorbent(s) 37. Filter paper 44 is folded much like a pleated coffee filter. Filter paper center section 44A forms bottom circular surface 31 of SPE disk 30. Filter paper outer section 44B extends up side 32 of SPE disk 30 forming side 32 of SPE disk 30. Glass fiber and sorbent layer 42 is formed on top of filter paper center section 44A and within outer section 44B of filter paper 44. Wet laid glass fiber layer 40 is formed on top of glass fiber and sorbent layer 42 and within outer ring section 44B of filter paper 44. Wet laid glass fiber layer 40 extends to the top of filter paper outer section 44B and forms top surface 34 of SPE disk 30. A typical 47 mm SPE disk 30 as shown in this example might require a 55 mm diameter glass fiber mesh or filter paper 44.

Figure 3A:
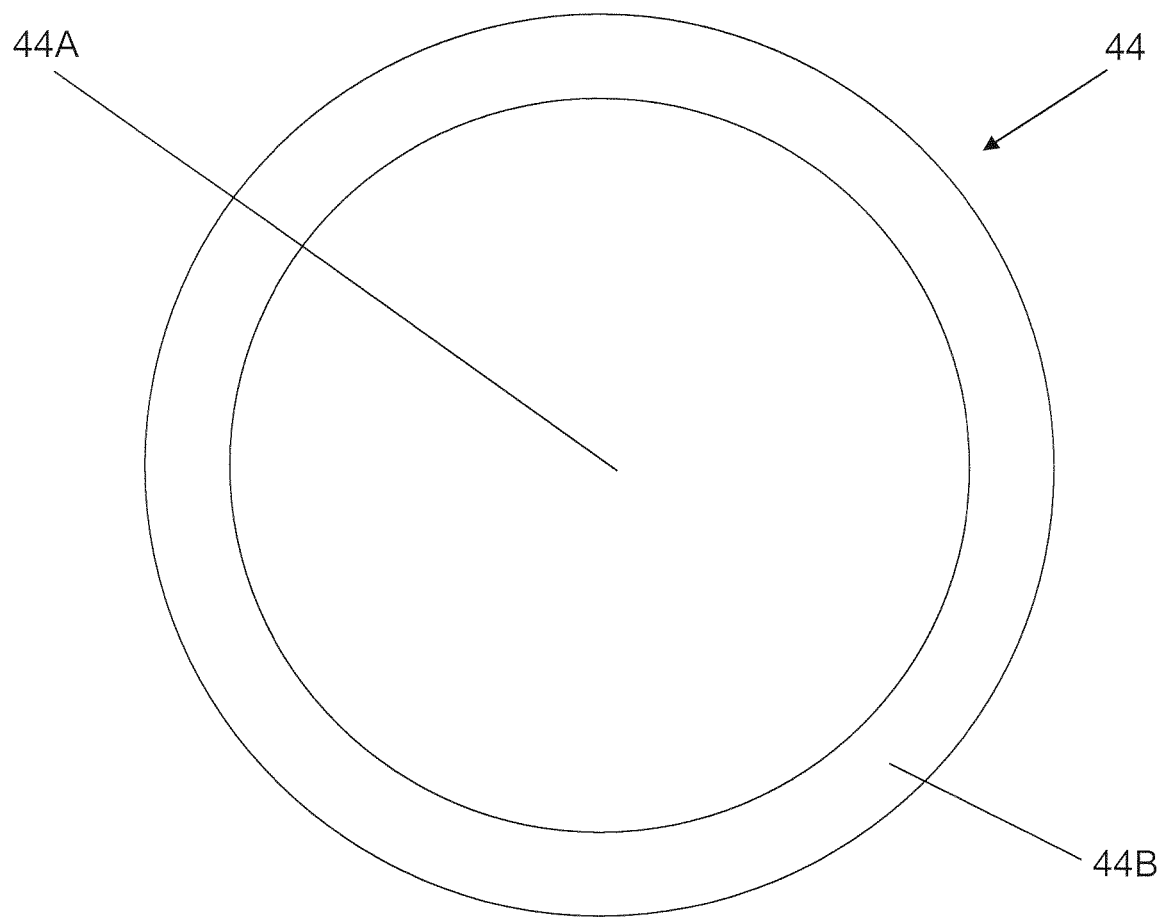
FIG. 3A shows a top view of one embodiment of the present invention.

FIG. 3A shows glass fiber mesh or filter paper 44 with the center circular section 44A and outer ring section 44B. When incorporated into SPE disk 30 as depicted in FIG. 3 center circular section 44A forms base 31, outer ring section 44B forms side 32 of SPE disk 30 as shown in FIG. 3.

Figure 4:
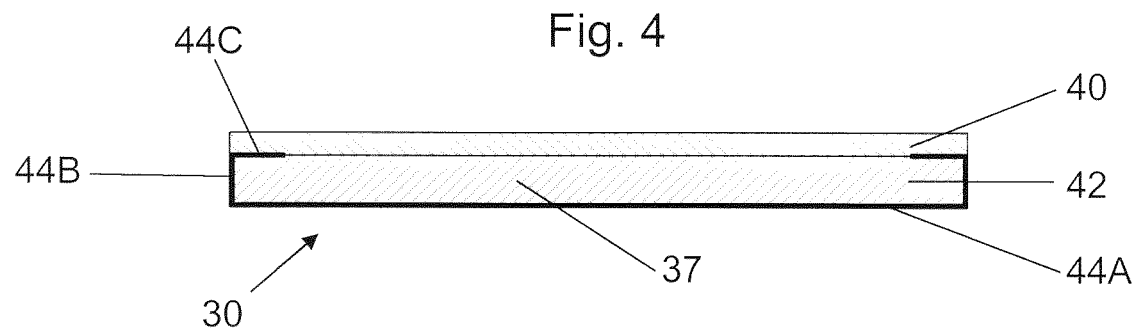
FIG. 4 shows a section view of one embodiment of the present invention.

FIG. 4 shows a cross section of an example of SPE Disk 30 constructed of glass fiber mesh or filter paper 44, wet laid glass fiber and sorbent(s) 37. Filter paper 44 is folded much like a pleated coffee filter. Filter paper center section 44A forms bottom circular surface 31 of SPE disk 30. Filter paper outer section 44B extends up side 32 of SPE disk 30 forming the lower portion of side 32 of SPE disk 30. Glass fiber and sorbent layer 42 is formed on top of filter paper center section 44A and within outer section 44B of filter paper 44. Filter paper outer section 44B forms part of cylindrical side 32 around sorbent and glass fiber layer 42. Outermost section 44C of filter paper 44 is folded over the top of layer 42 and tucked in between layer 42 and layer 40. Wet laid glass fiber layer 40 forms the upper portion of side 32 and top surface 34 of SPE disk 30. A typical 47 mm SPE disk 30 as shown in this example might require a 60 mm diameter glass fiber mesh or filter paper 44.

Figure 4A:
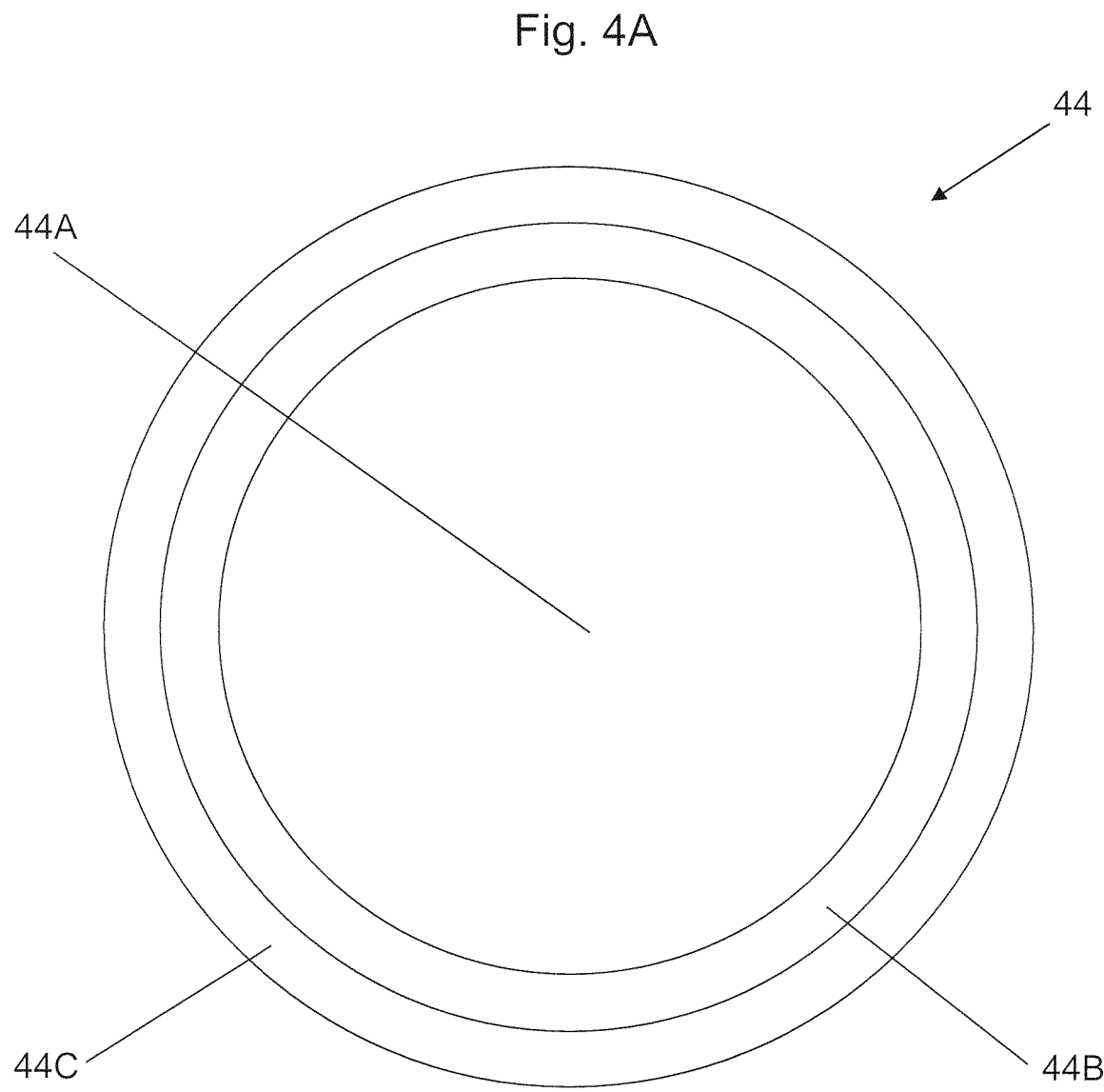
FIG. 4A shows a top view of one embodiment of the present invention.

FIG. 4A shows glass fiber mesh or filter paper 44 with the center circular section 44A and outer ring section 44B and outermost ring section 44C. When incorporated into SPE disk 30 as depicted in FIG. 4 center circular section 44A forms base 31, outer ring section 44B forms the lower portion of side 32 and outermost ring section 44C is folded in between layer 42 and layer 40 of SPE disk 30 as shown in FIG. 4.

Figure 5:
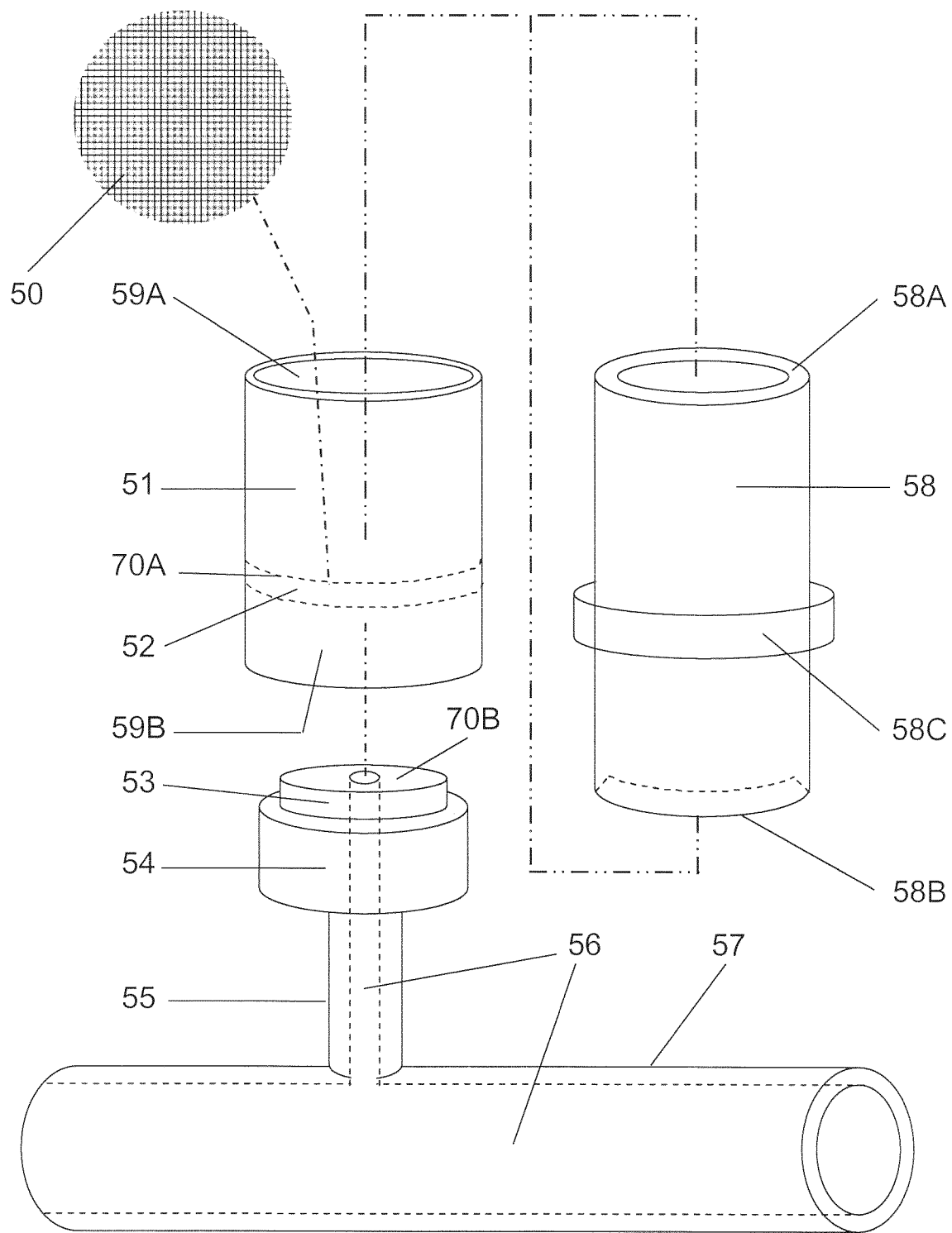
FIG. 5 shows an assembly view of one embodiment of the present invention.

FIG. 5 shows the fixtures and tools used to manufacture SPE disk 30 as shown in the examples depicted in FIG. 2, FIG. 3 and FIG. 4. Disk forming mold 51 (shown in this figure without enlarged upper section 62) has a circular projection or shelf 52 extending from the interior cylindrical surface. Shelf or projection 52 divides the interior of disk forming mold 51 into upper cavity 59A and lower cavity 59B. Disk forming mold plug 54 has cylindrical projection 53. In use plug 54 is inserted into lower cavity 59B of disk mold 51. Plug 54 may have radial aspiration grooves 72 and circular aspiration grooves 74 (neither shown in this figure) on the upper circular surface of cylindrical projection 53 of plug 54, to aid in the distribution of vacuum under screen 50. Using more than one screen 50 stacked on top of each other will also aid in the distribution of vacuum especially if aspiration grooves are not employed. The clearance between plug 54 and cavity 59B of mold 51 is minimal to allow a vacuum to be established in passageway 56 and under screen 50 during SPE disk 30 fabrication. Alternately a means of establishing a seal between plug 54 and cavity 59B of mold 51 such as O-ring(s) 54B (not shown in this figure but depicted in FIG. 9) may be employed. When plug 54 is inserted into cavity 59B upper surface 70B of cylindrical projection 53 and upper surface 70A of shelf 52 are approximately level and form base 70 (as shown in FIG. 10). Screen or other porous material 50 sits on, or is part of, base 70. Connecting pipe 55 attaches plug 54 to vacuum manifold 57. Vacuum manifold 57 may have multiple connecting pipes 55 attaching multiple plugs 54 to vacuum manifold 57 to facilitate the manufacture of multiple SPE disks 30. Passageway 56 extends from beneath screen 50, through radial aspiration grooves 72 and (if present) circular aspiration grooves 74, (neither shown in this figure) through cylindrical projection 53, plug 54, pipe 55 and into vacuum manifold 57. Passageway 56 serves to apply vacuum below screen 50 to facilitate the removal of fluids during the fabrication of SPE disk 30. Cylindrical tool 58 has blunt end 58A, angled end 58B and fixed or adjustable stop 58C. Angled end 58B has a pointed edge on the outer cylindrical wall of cylindrical tool 58 and fits snugly into cavity 59A of disk mold 51. Blunt end 58A has a smaller diameter than angled end 58B to allow it to be used to insert filter paper 44 into cavity 59A. During insertion of filter paper 44 into cavity 59A filter paper 44 will fold over blunt end 58A of cylindrical tool 58. Filter paper 44 will fit snuggly into cavity 59A and fold much like a pleated coffee filter into a cup like shape, but will not be torn or otherwise damaged. Stop 58C is a ring shaped extension protruding from the exterior cylindrical wall of cylindrical tool 58. Stop 58C may be a fixed part of cylindrical tool 58 or may be a separate piece that fits snuggly around cylindrical tool 58. Stop 58C be held in place using set screws or other suitable means to allow adjustment of the depth of insertion into cavity 59A of angled end 58B. Stop 58C is used to limit the depth of insertion when angled end 58B is inserted into cavity 59A. Stop 58C may be adjustable to allow cylindrical tool 58 to be set to allow different insertion depths of angled end 58B into cavity 59A. Different insertion depths may required by various SPE disks 30 having differing amounts or types of sorbent 37 (as shown in FIG. 2, FIG. 3 and FIG. 4) and therefore different thicknesses of glass fiber and sorbent layer 42 of SPE disk 30. Stop 58C is not used to limit the depth of insertion into cavity 59A of blunt end 58A with filter paper 44 being inserted until center section 44A rests on screen 50. Blunt end 58A and angled end 58B of cylindrical tool 58 may also be provided for by having two separate tools.

Figure 6:
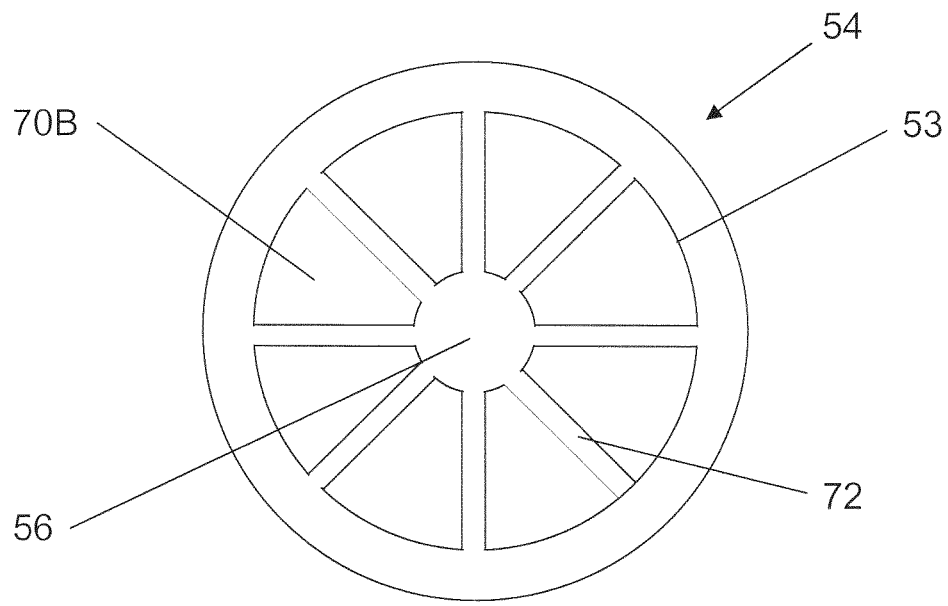
FIG. 6 shows a top view of one embodiment of the present invention.

FIG. 6 shows a top view of disk forming mold plug 54 having radial aspiration groves 72 in the upper circular surface of cylindrical projection 53. Radial aspiration grooves 72 serve to distribute vacuum under screen 50 to provide for uniform flow of liquids through screen 50 and out passageway 56 during the fabrication of SPE disk 30. Upper circular surface 70B of cylindrical projection 53 forms part of base 70 as shown in FIG. 10.

Figure 7:
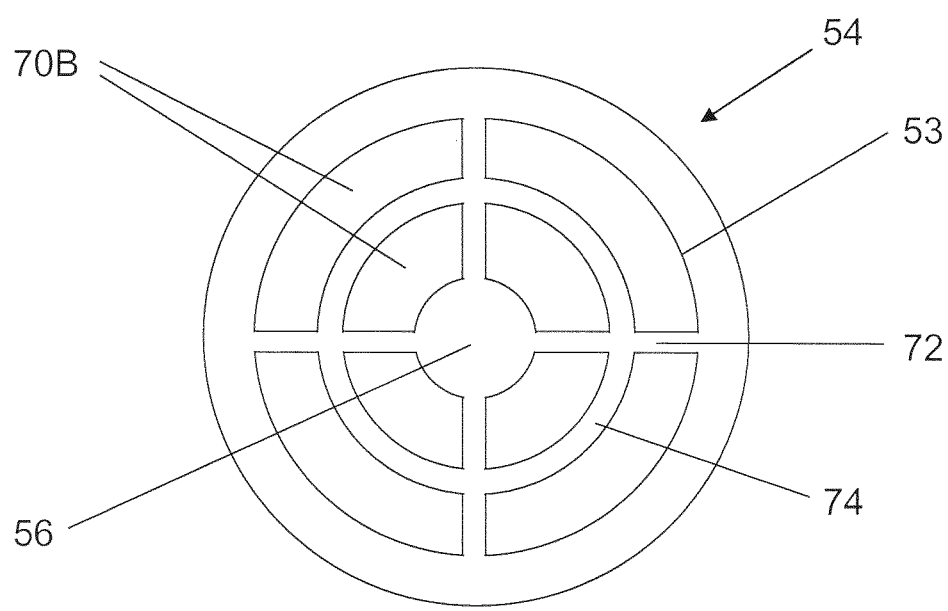
FIG. 7 shows a top view of one embodiment of the present invention.

FIG. 7 shows a top view of disk forming mold plug 54 having radial aspiration grooves 72 and circular aspiration groves 74 in the upper circular surface of cylindrical projection 53. Radial aspiration grooves 72 and circular aspiration grooves 74 serve to distribute vacuum under screen 50 to provide for uniform flow of liquids through screen 50 and out passageway 56 during the fabrication of SPE disk 30. Upper circular surface 70B of cylindrical projection 53 forms part of base 70 as shown in FIG. 10.

Figure 8:
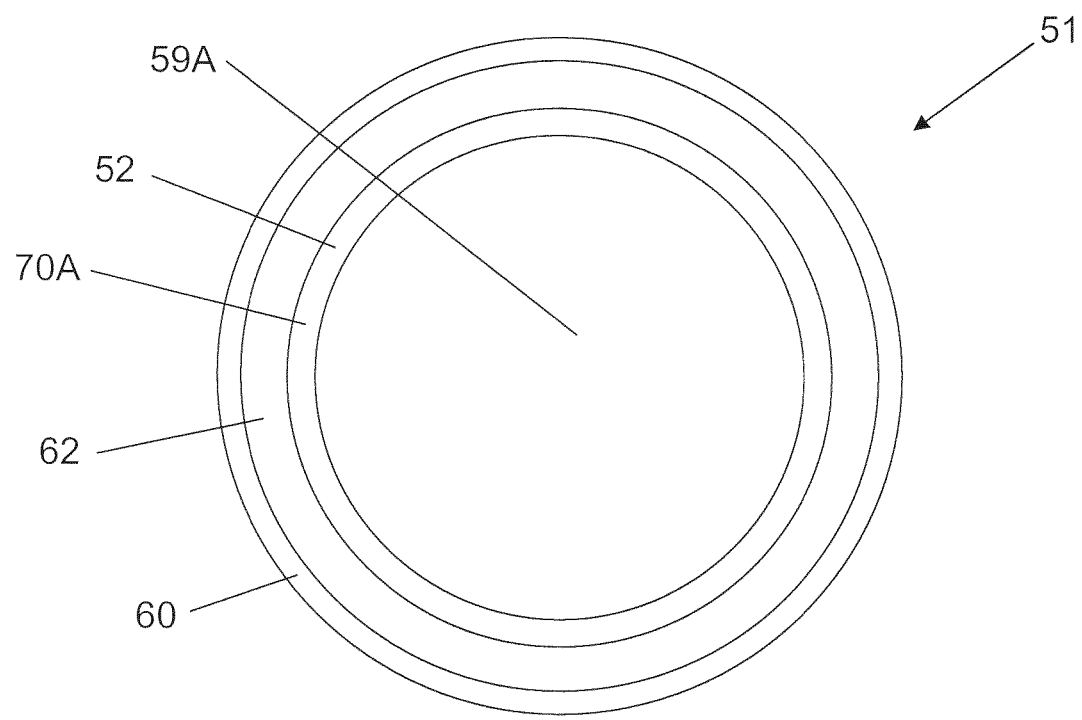
FIG. 8 shows a top view of one embodiment of the present invention.

FIG. 8 shows the top view of disk forming mold 51. Recess 62 of upper section 60 is used to center filter paper 44 over cavity 59A. Shelf 52 projects from the interior cylindrical surface of mold 51 and divides the interior of mold 51 unto upper cavity 59A and lower cavity 59B. Upper surface 70A of shelf 52 along with upper surface 70B of cylindrical projection 53 on plug 54 (not shown) form base 70 as shown in FIG. 10.

Figure 8A:
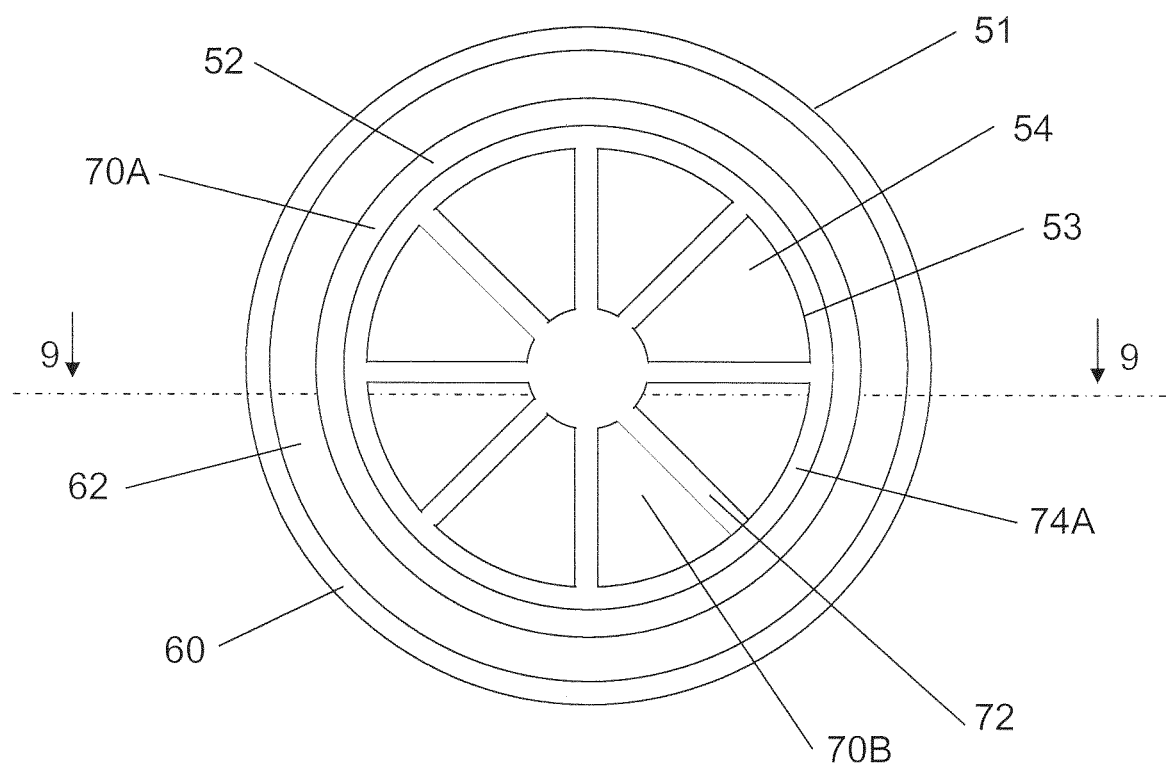
FIG. 8A shows a top view of one embodiment of the present invention.

FIG. 8A shows the top view of disk forming mold 51 with disk forming mold plug 54 inserted into cavity 59B. Recess 62 of upper section 60 is used to center filter paper 44 over cavity 59A. Shelf 52 projects from the interior cylindrical surface of mold 51 and divides the interior of mold 51 unto upper cavity 59A and lower cavity 59B. Upper surface 70A of shelf 52 and upper surface 70B of cylindrical projection 53 on plug 54 form base 70 as shown in FIG. 10. Radial aspiration grooves 72 serve to distribute vacuum under screen 50 to provide for uniform flow of liquids through screen 50 and out passageway 56 during the fabrication of SPE disk 30. Gap 74A between cylindrical projection 53 and shelf 52 serves the same function as circular aspiration groove 74 (shown in FIG. 7) with both circular aspiration groove 74 and gap 74A being connected to vacuum manifold 57 by way of radial aspiration grooves 72 and the other components of passageway 56 when screen 50 is resting on base 70 during SPE disk 30 fabrication.

Figure 9:
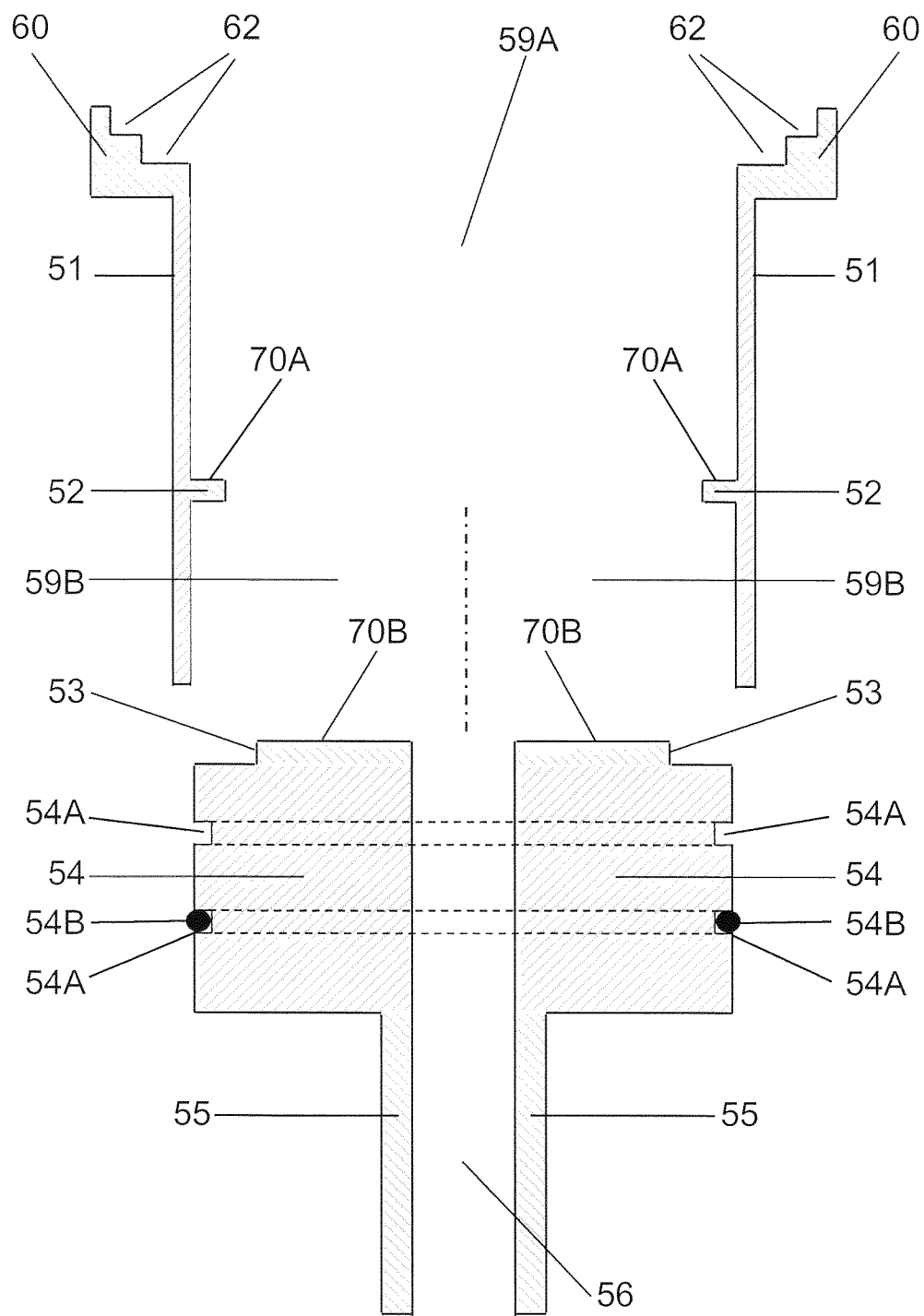
FIG. 9 shows a section view of one embodiment of the present invention taken along line 9-9 in FIG. 8A.
Figure 10:
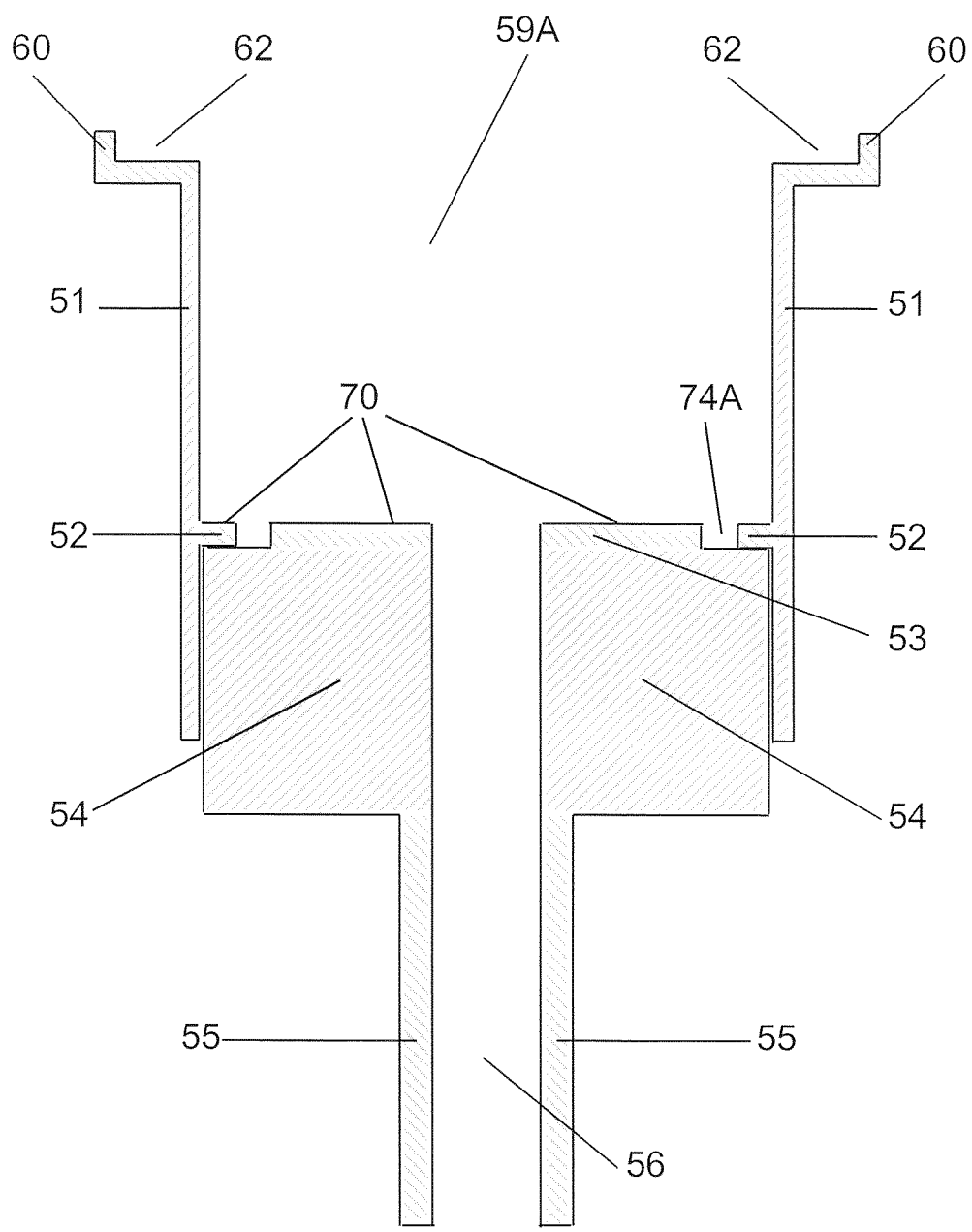
FIG. 10 shows a section view of one embodiment of the present invention.

FIG. 9 shows a cross section of the disk forming mold 51, disk forming mold plug 54, and associated parts with plug 54 not inserted into cavity 59B. Upper plug surface 70B of cylindrical projection 53, on plug 54, is shown. Aspiration groves are not shown on upper plug surface 70B. Radial aspiration groves 72 and circular aspiration groves 74 are shown in FIG. 6 and FIG. 7. Upper shelf surface 70A and upper plug surface 70B which form base 70 (as depicted in FIG. 10) are shown. Enlarged upper section 60 of mold 51 has two concentric recesses 62 which facilitates the centering of glass fiber mesh or filter paper 44 over cavity 59A of mold 51. There may be more than one recess 62 in enlarged upper section 60 of mold 51, arranged concentrically, with the smaller diameter recess 62 being at a lower level than the next largest recess 62. The different diameter recesses 62 are to accommodate different diameters of filter paper 44. Two concentric recesses 62 are shown in this drawing. Disk forming mold plug 54, is shown with two O-ring grooves 54A with the lower O-ring groove 54A having O-ring 54B shown. Connecting pipe 55 is attached to the lower part of plug 54. Passageway 56 extends through cylindrical projection 53, plug 54 and connecting pipe 55 to vacuum manifold 57 (as shown in FIG. 5).

FIG. 10 shows a cross section of disk forming mold 51, plug 54, and associated parts with plug 54 inserted into lower cavity 59B of disk forming mold 51. One recess 62 is shown in this drawing. Upper shelf surface 70A and of upper plug surface 70B (as shown in FIG. 5 and FIG. 9) are shown and form base 70. Note that gap 74A in between shelf 52 and cylindrical projection 53 functions as a circular aspiration groove with radial aspiration grooves 72 providing vacuum and making gap 74A part of passageway 56.

Figure 11:
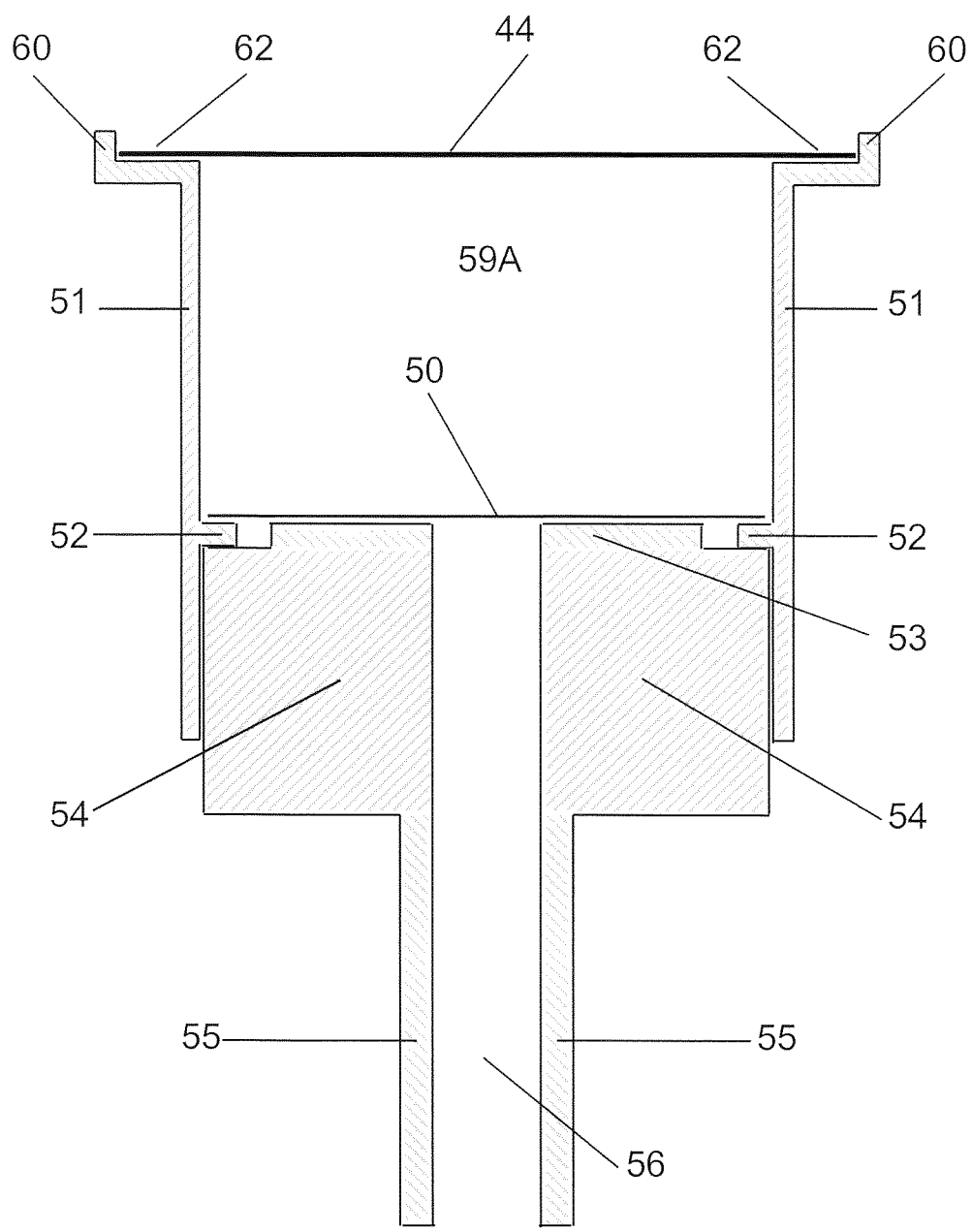
FIG. 11 shows a section view of one embodiment of the present invention.

FIG. 11 shows a cross section of disk forming mold 51 and plug 54 with screen 50 resting on base 70. Glass fiber filter paper 44 is positioned in recess 62 of mold 51 over upper cavity 59A.

Figure 12:
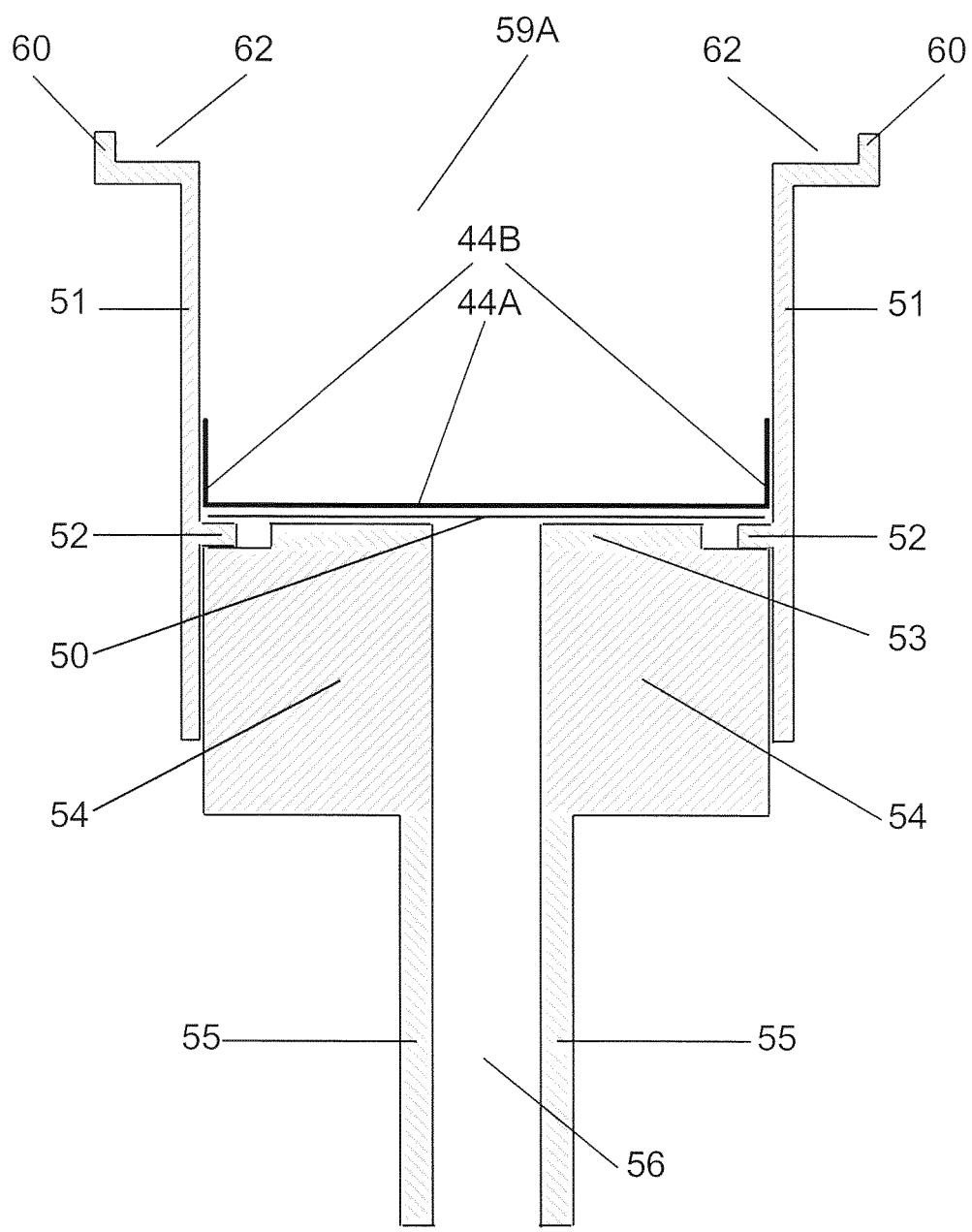
FIG. 12 shows a section view of one embodiment of the present invention.

FIG. 12 shows a cross section of disk forming mold 51, plug 54, screen 50 and associated parts with glass fiber filter paper 44 inserted into upper cavity 59A of mold 51 with center circular section 44A resting on screen 50. Outer section 44B of filter paper 44 is folded and resting against the interior cylindrical wall of disk forming mold 51.

Figure 13:
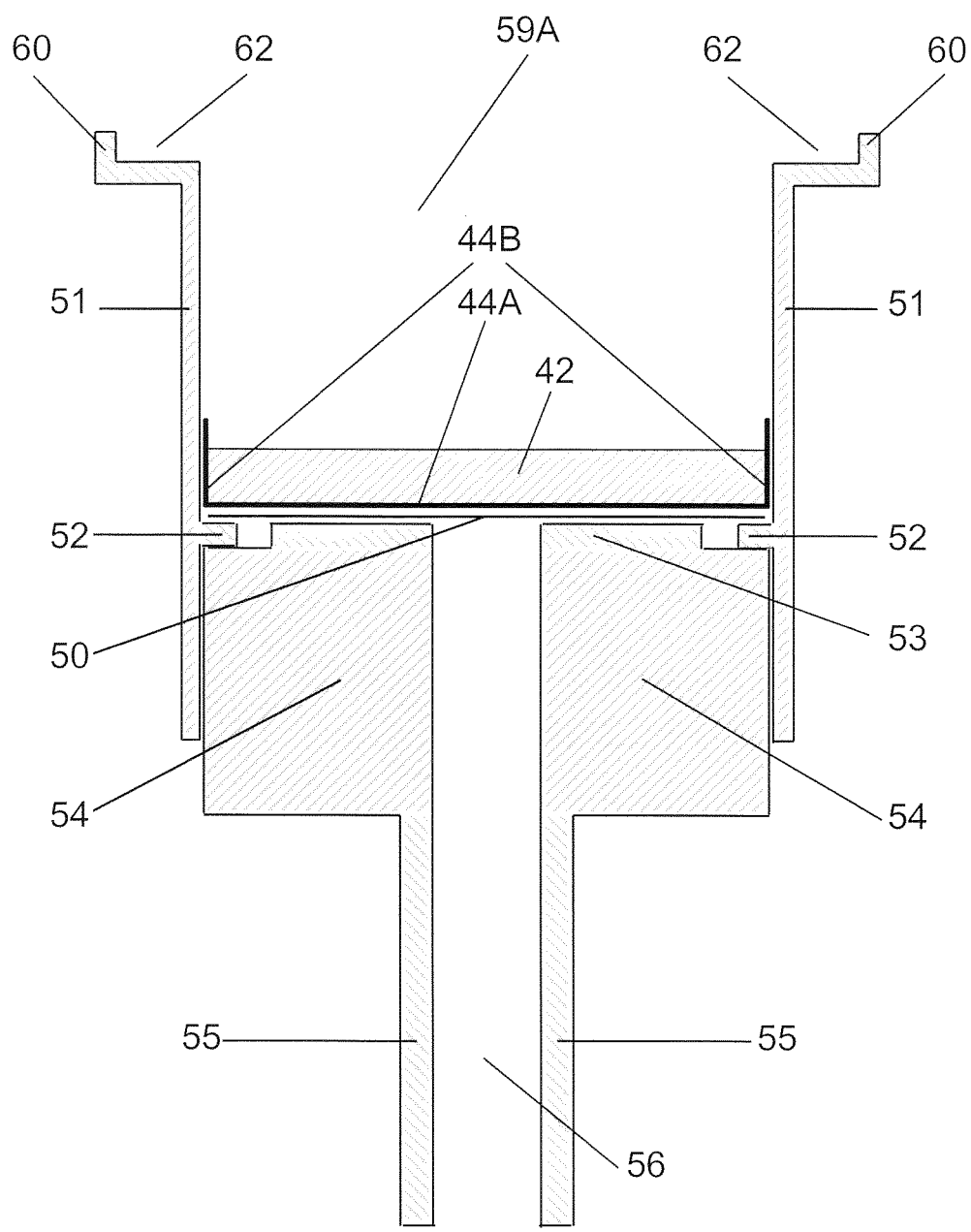
FIG. 13 shows a section view of one embodiment of the present invention.

FIG. 13 shows a cross section of disk forming mold 51, plug 54, screen 50 and associated parts with glass fiber and sorbent layer 42 of SPE disk 30 formed within the previously inserted filter paper 44. Center circular section 44A of glass fiber filter paper 44 is under glass fiber and sorbent layer 42 and outer section 44B of filter paper 44 extends above glass fiber and sorbent layer 42 along the interior cylindrical wall of disk mold 51.

Figure 13A:
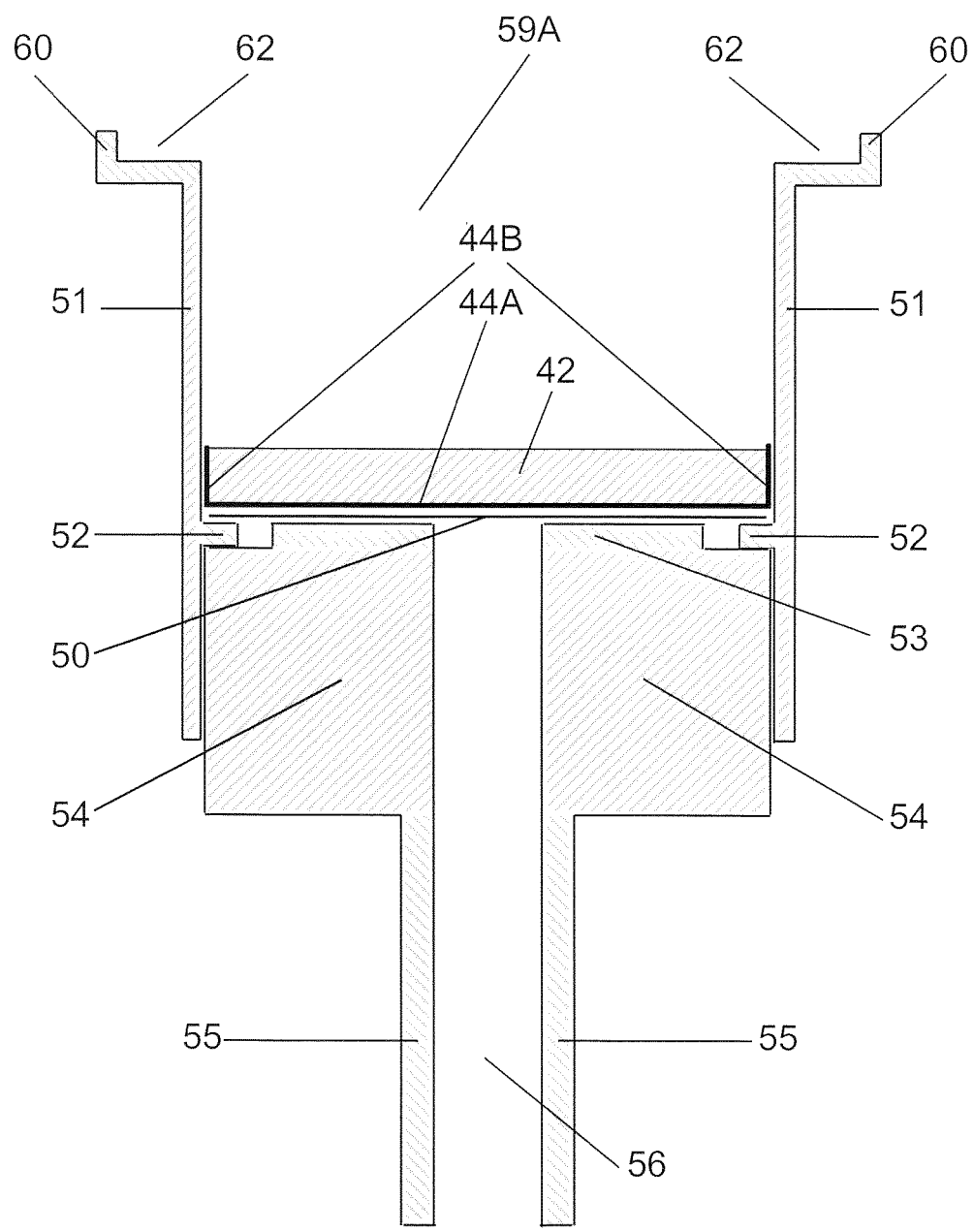
FIG. 13A shows a section view of one embodiment of the present invention.

FIG. 13A shows a cross section of disk forming mold 51, plug 54, screen 50 and associated parts with glass fiber and sorbent layer 42 of SPE disk 30 formed within the previously inserted filter paper 44. Center circular section 44A of glass fiber filter paper 44 is under glass fiber and sorbent layer 42 and outer section 44B of filter paper 44 extends only to the top of glass fiber and sorbent layer 42.

FIG. 14 shows a cross section of disk forming mold 51, plug 54, screen 50 and associated parts with glass fiber and sorbent layer 42 of SPE disk 30 formed within the previously inserted filter paper 44. Center circular section 44A of glass fiber filter paper 44 is under glass fiber and sorbent layer 42 and outer section 44B of filter paper 44 extends only to the top of glass fiber and sorbent layer 42. Outermost section 44C of the filter paper 44 folded over the top of, and resting on, glass fiber and sorbent layer 42.

Figure 15:
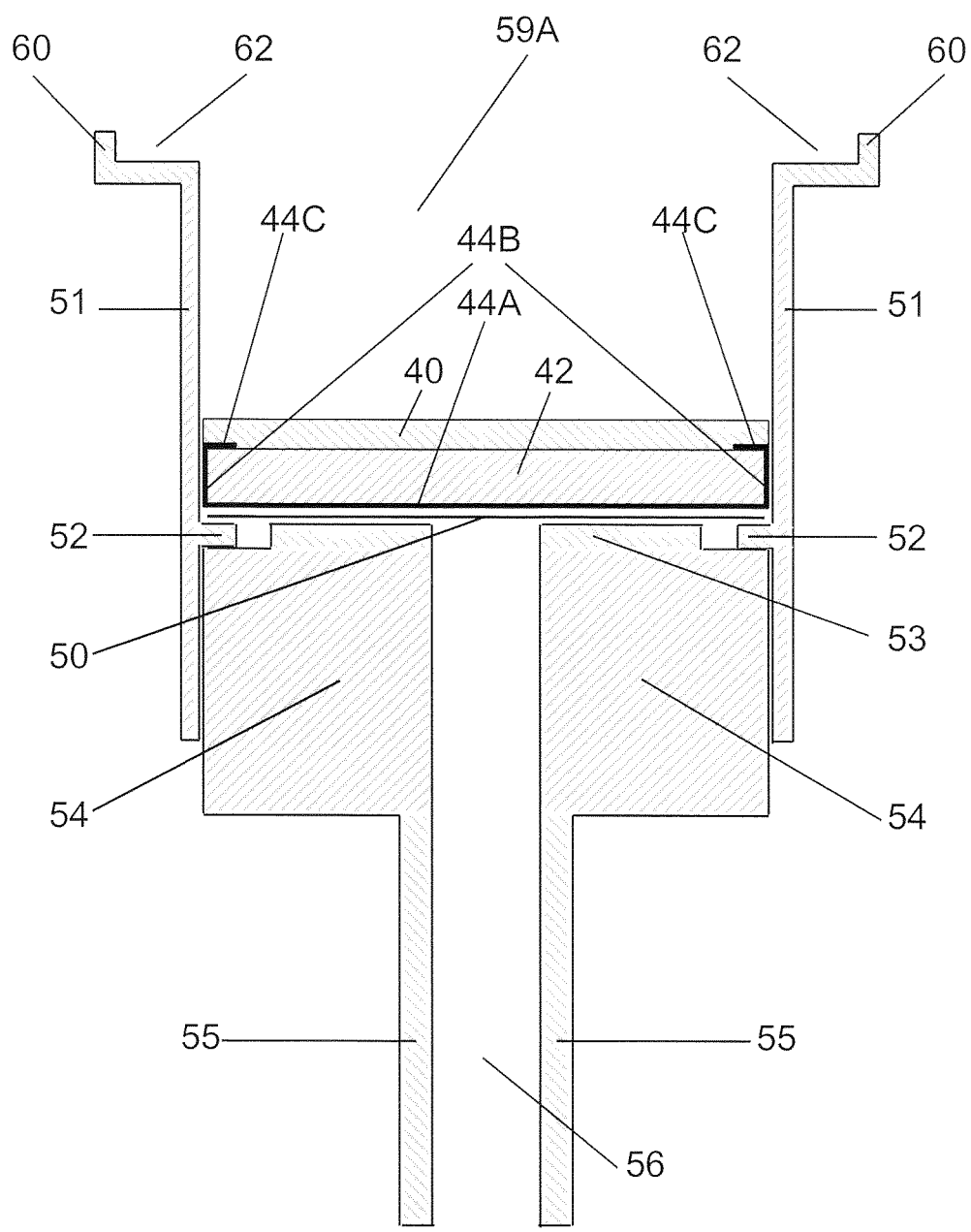
FIG. 15 shows a section view of one embodiment of the present invention.

FIG. 15 shows a cross section of disk forming mold 51, plug 54, screen 50 and associated parts with top glass fiber layer 40 formed over glass fiber and sorbent layer 42 and covering and securing the previously folded over outermost section 44C of filter paper 44. This is SPE disk 30 construction as shown in FIG. 4.

Figure 16:
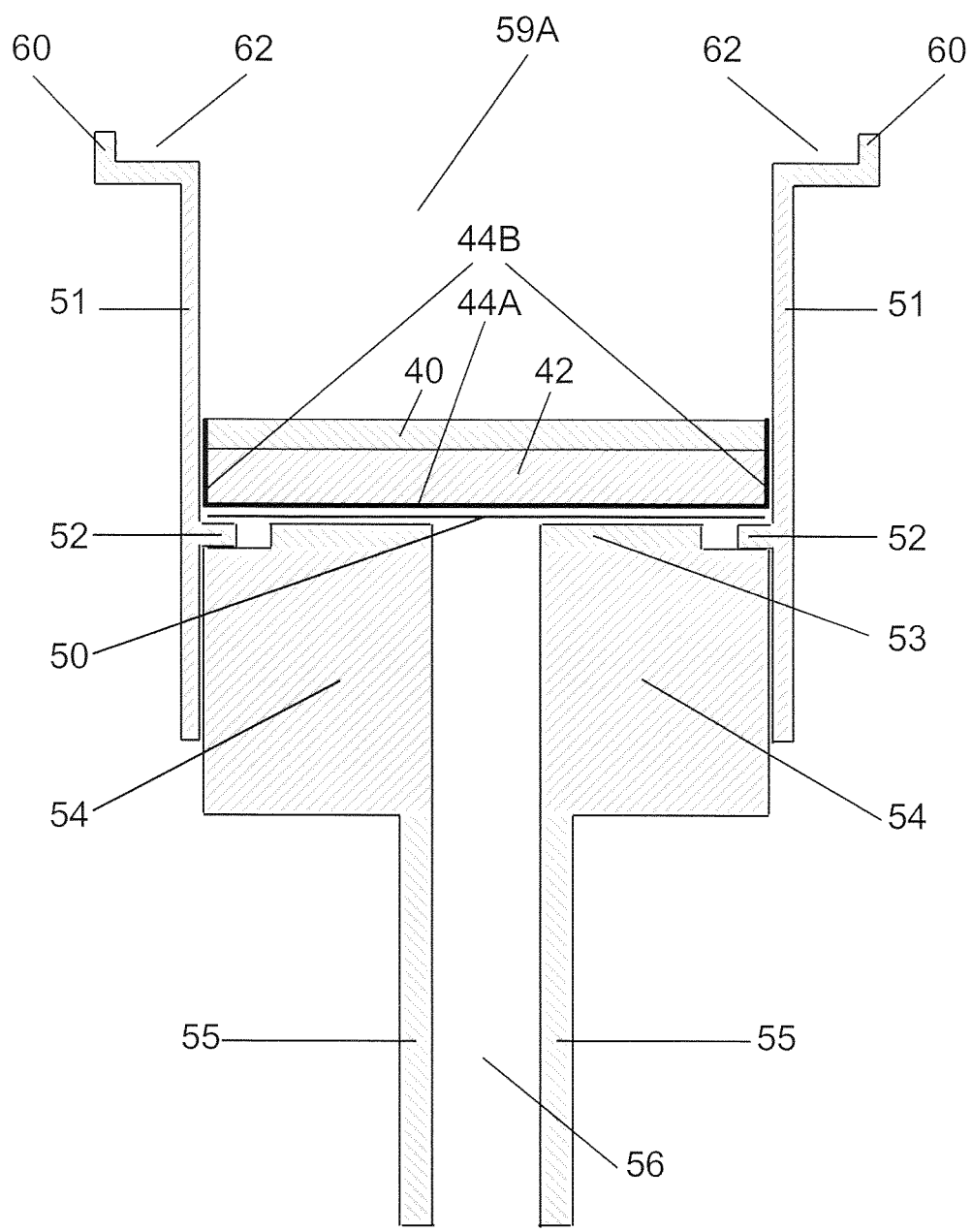
FIG. 16 shows a section view of one embodiment of the present invention.

FIG. 16 shows a cross section of disk forming mold 51, plug 54, screen 50 and associated parts with top layer of glass fiber 40 formed over glass fiber and sorbent layer 42. Outer section 44B of filter paper 44 extends up side 32 (as shown in FIG. 1) of SPE disk 30 to the top of top glass fiber layer 40. This is SPE disk 30 construction as shown in FIG. 3.

Figure 17:
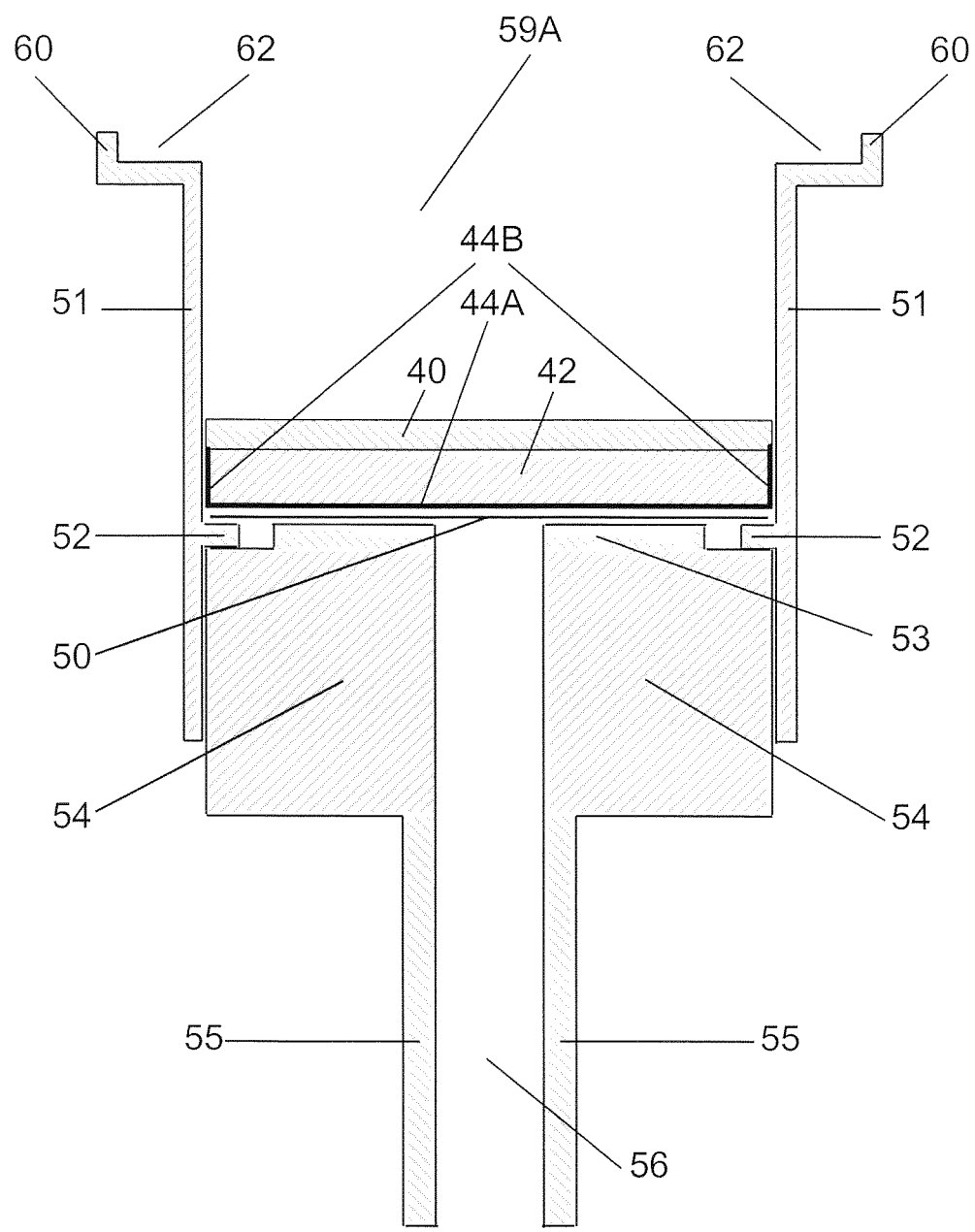
FIG. 17 shows a section view of one embodiment of the present invention.

FIG. 17 shows a cross section of disk forming mold 51, plug 54, screen 50 and associated parts with top layer of glass fiber 40 formed over glass fiber and sorbent layer 42. Outer section 44B of filter paper 44 extends up side 32 (as shown in FIG. 1) of SPE disk 30 only to the top of glass fiber and sorbent layer 42. This is SPE disk 30 construction as shown in FIG. 2.

Advantages

The improved SPE disk 30 of this invention encapsulates the particulate sorbent 37 present in glass fiber and sorbent layer 42 in a glass fiber matrix. This encapsulation limits the shedding of sorbent particles from finished SPE disk 30. Sorbent particles, when shed from an SPE disk, can interfere with the operation of, or damage, valves present on many automated and manually operated SPE disk extraction apparatuses. This encapsulation of the sorbent particles is accomplished using a less complex manufacturing process than prior art. This less complex manufacturing process also generates less waste. Outer ring section 44B and outermost ring section 44C of filter paper 44 also aids in maintaining the structural integrity of SPE disk 30 compared with previous designs having filter paper 44 only forming circular bottom surface 31. In prior art designs having filter paper 44 only forming bottom circular surface 31 and not extending up side 32, filter paper 44 is prone to peel off of bottom circular surface 31. Absent the structural reinforcement provided by outer ring section 44B and outermost ring section 44C of filter paper 44, glass fiber and sorbent layer 42 is prone to break apart and to shed loose sorbent particles from edge 32. Top glass fiber layer 40 also prevents shedding of sorbent particles, and when in use in an SPE disk extraction procedure, glass fiber layer 40 can retain some very non-polar method analytes or interfering compounds. These very non-polar analytes or interfering compounds, if not adsorbed by the glass fiber present in top glass fiber layer 40, would be adsorbed by glass fiber and sorbent layer 42; which in the absence of top glass fiber layer 40 would form top circular surface 34 of SPE disk 30. The sorbent in glass fiber and sorbent layer 42 has a finite capacity to adsorb analytes, and by retaining some very non-polar analytes or interfering compounds on top glass fiber layer 40, the capacity sorbent 37 in glass fiber and sorbent layer 42, to retain polar and moderately non-polar method analytes is increased. The improved SPE disk 30 of this invention also has the sorbent distributed uniformly, not located in a central section of the SPE disk, as found in some prior art. Locating the sorbent in a central section of the SPE disk, surrounded by a ring of glass fiber not containing sorbent, as found in some prior art, mandates a larger diameter SPE disk. SPE disk 30 of this invention can be used with existing SPE disk extraction apparatuses which were designed to work with a 47 mm diameter SPE disk, many of which are not compatible with a 50 mm diameter SPE disk, as found in some prior art.

Operation:

The tools used to manufacture SPE 30 should be free from chemical contamination which could be detrimental to the end use of SPE disk 30 in analytical chemistry procedures. A suitable vacuum (or positive pressure) source and a means to collect the water and water/alcohol mixtures generated by the manufacturing process should be provided.

Glass fiber mesh or filter paper 44 is glass microfiber filter paper which is typically and preferentially made of binderless borosilicate glass fiber. Filter paper 44 may or may not contain boron or organic binders. Filter paper 44 is typically, but not necessarily, circular and typically 0.3 mm to 0.6 mm thick, although thinner or thicker filter paper 44 may also be suitable. Examples of suitable filter paper 44 include Whatman™ GF/A Part Number 1820-055 (55 mm diameter) and Whatman™ GF/A Part Number 1820-060 (60 mm diameter).

Glass fiber suspension 36, used to form wet laid glass fiber layer 40 and wet laid glass fiber and sorbent(s) layer 42, is prepared from bulk glass fiber such as CM 210-04-F glass fiber from Lauscha Fiber International. This glass fiber is supplied in bales, not loose glass fibers, although glass fiber supplied as loose fibers may be suitable.

To prepare suspension 36, 4,500 mL of distilled, deionized, reverse osmosis or other suitable water is added to a suitable container such as a 18,927 mL plastic pail. The water may be, and is preferentially, acidified to a pH between 2.0 and 2.2 with hydrochloric or other suitable acid. Next 20 grams of CM 210-04-F glass fiber is added to the acidified water. The glass fiber is then dispersed using a hand held blender such as a Mueller Ultra Stick Hand Blender or other suitable means. Some manipulation of the Mueller blender is necessary initially to break up the glass fiber but after 15 seconds it should be possible to position the Mueller blender, with the guard around the cutting blade resting on the bottom of the 18,927 mL pail, and have the suspension circulate by the action of the Mueller blender. Two minutes of total blending time is necessary. This glass fiber suspension is suspension 36. Suspension 36 may be prepared in larger quantities by using a more powerful blender and increasing the quantities of pH 2.0 to pH 2.2 water and glass fiber accordingly. Note that care must be exercised throughout this process to avoid introducing plasticizers or other impurities into the disk ingredients or finished SPE disk 30 as these impurities are detrimental to the use of SPE disk 30 for analytical chemistry purposes.

The next step is to prepare suspension 38, used to form sorbent and glass fiber layer 42 of SPE disk 30 as shown in FIGS. 2, 3, 4 and FIGS. 13 through 17. First weigh an appropriate amount of sorbent 37 into a clean container such as a beaker. More than one type of sorbent 37 may be used. Dividing the weight of sorbent 37 used by the number of SPE disk(s) 30 to be produced will yield the sorbent mass per disk. Examples of sorbent 37 include divinylbenzene polymers (DVB) which may be further modified with hydrophilic, anion or cation exchange capability and silica, which can have its surface modified a number of ways including with bonded octadecyl (C-18) or octyl (C-8) functionality. Sorbent 37 is supplied as a fine powder or particles. Typical particle sizes for sorbent 37 are 5 µm to 80 µm although sorbent 37 may have smaller or larger particle sizes.

Next add isopropyl alcohol to the beaker in a quantity sufficient cover and saturate sorbent 37 and mix sorbent 37 in the isopropyl alcohol. Other alcohols or polar solvents may also be suitable. This is done as sorbent 37 may not otherwise disperse in aqueous glass fiber suspension 36. More alcohol may be necessary if a sorbent that has poor water wettability characteristics such as silica based C-18 is being used. Next add previously prepared glass fiber suspension 36 in a quantity sufficient to bring the sorbent and alcohol mixture up to the desired volume and mix thoroughly. The resulting suspension is sorbent and glass fiber suspension 38.

Once sorbent suspension 38 has been prepared SPE disk 30 can be manufactured in the following steps. Assemble all the tools shown in FIG. 5 and attach vacuum manifold 57 to a suitable vacuum supply. A means to collect the liquids drained through vacuum manifold 57 should also be provided. Place mold 51 on plug 54. Lower cavity 59B should be placed over plug 54 and slid down as far as possible until shelf 52 rests on plug 54 as shown in FIG. 10. Screen 50 should be placed in upper cavity 59A and should rest on base 70. Measuring cups may be used to introduce suspension 36 and suspension 38 into cavity 59A. The size of the necessary measuring cups depends on the specific SPE disk 30 being manufactured. A suitable means to add pH 2.0 to 2.2 water into cavity 59A of disk forming mold 51 to wet glass fiber filter paper 44 should also be provided.

For all three examples of SPE disk 30 construction as depicted in FIGS. 2, 3 and 4 the next steps are as follows. Place glass fiber mesh or filter paper 44 into recess 62 of disk forming mold 51 as shown in FIG. 11. If more than one recess 62 is present in enlarged upper section 60 of disk mold 51 place filter paper 44 in the smallest recess into which it will fit. Recess 62 is the same diameter or slightly larger than filter paper 44. Recess 62 serves to center filter paper 44 over upper cavity 59A of mold 51. The necessary diameter of filter paper 44 is dependent on the specific construction of SPE disk 30 being manufactured. and is dependent on factors such that include the amount of sorbent 37, the thickness of layer 42, the thickness of layer 40 and the diameter of SPE disk 30. Enlarged upper section 60 of disk forming mold 51 may have more than one concentric recess 62 to accommodate different diameters of filter paper 44. Note that FIGS. 10 through 17 show examples of disk forming mold 51 having a single recess 62. FIG. 9 shows an example of disk forming mold 51 with two recesses 62.

Next, blunt end 58A of cylindrical tool 58 is used to push filter paper 44 into cavity 59A of disk forming mold 51. Blunt end 58A of cylindrical tool 58 should be centered over filter paper 44 which should fold around blunt end 58A on insertion into cavity 59A. Filter paper 44 should be inserted until filter paper 44 sits on top of screen 50. Screen 50 sits directly on base 70. Stop 58C of cylindrical tool 58 should not limit the insertion depth of blunt end 58A. When inserted into upper cavity 59A of mold 51, filter paper 44 folds much like a pleated coffee filter into a cup like shape as shown in FIG. 12.

Filter paper 44 may preferentially next be wetted with water. Wetting glass fiber filter paper 44 after it has been inserted into cavity 59A reduces the flow of air through filter paper 44 when vacuum is applied resulting in greater vacuum under screen 50. This vacuum forces center section 44A of filter paper 44 against screen 50 and screen 50 is likewise forced onto base 70. Outer section 44B of filter paper 44 is also held against the interior wall of upper cavity 59A by the action of the vacuum as shown in FIG. 12. Next, while still applying vacuum, add an aliquot of glass fiber and sorbent suspension 38 into cavity 59A using a suitable measuring cup, to form glass fiber and sorbent layer 42. This step is shown in FIG. 13 for SPE disk 30 constructions as depicted in FIGS. 3 and 4 and FIG. 13A for SPE disk 30 construction as depicted in FIG. 2.

The next steps are similar for SPE disk 30 constructions as depicted in FIGS. 2 and 3. If SPE disk 30 construction as depicted in FIG. 2 or 3 is being manufactured continue to apply vacuum and add, using a suitable measuring cup or other means, an aliquot of glass fiber suspension 36 to cavity 59A of mold 51 to form layer 40. After all the free liquid has been substantially removed, blunt end 58A of cylindrical tool 58 may be inserted into cavity 59A to compress side 32 of SPE disk 30 and smooth out the edge of top surface 34. This compression with blunt end 58A also serves to increase the structural integrity of the finished SPE disk 30. SPE disk 30 as shown in FIG. 2 is depicted while still in mold 51 in FIG. 17. SPE disk 30 as shown in FIG. 3 is depicted while still in mold 51 in FIG. 16. If SPE disk 30 as depicted in FIG. 4 is being manufactured the next steps are as follows. While maintaining vacuum, insert angled end 58B of cylindrical tool 58 into cavity 59A. Stop 58C of cylindrical tool 58 should limit the insertion depth of angled end 58B so that outermost section 44C of filter paper 44 is pulled away from the wall of cavity 59A but glass fiber and sorbent layer 42 is not disturbed and outer section 44B of filter paper 44 remains up against the wall of cavity 59A. Next blunt end 58A of cylindrical tool 58 may be inserted into cavity 59A to further fold outermost section 44C so that it rests directly on top of layer 42. Stop 58C should not be limiting the insertion depth of blunt end 58A. This is shown in FIG. 14. Next, continue to apply vacuum and add, using a suitable measuring cup, an aliquot of glass fiber suspension 36 to cavity 59A of mold 51 to form layer 40. After all the liquid has been substantially removed, blunt end 58A of cylindrical tool 58 may be inserted into cavity 59A to compress side 32 of SPE disk 30 and smooth out the edge of top surface 34. This compression with blunt end 58A also serves to increase the structural integrity of finished SPE disk 30. SPE disk 30 as shown in FIG. 4 is depicted while still in mold 51 in FIG. 15. For all three examples of SPE disk 30 just discussed (as depicted in FIGS. 2, 3 and 4) the next steps are as follows. Remove mold 51 from plug 54. Insert a dowel or similar tool into cavity 59B of mold 51 to force screen 50 (and SPE disk 30) up and remove SPE disk 30 from mold 51 separating SPE disk 30 from screen 50. The finished SPE disk 30 may then be placed on a suitable surface and dried. If temperatures above room temperature are employed to facilitate the drying process the temperature limit of sorbent 37 must not be exceeded.

FIG. 2 SPE Disk 30 Example:

The disk depicted in FIG. 2 could be prepared using a variety of different sorbents, thicknesses and diameters. One possible example is a 47 mm diameter disk prepared with the following composition.

Materials
  Glass fiber suspension 36
  DVB (divinylbenzene) sorbent 37
  Isopropyl alcohol
  Filter paper 44 with a diameter of 50 mm
  Composition of glass fiber and sorbent suspension 38
  4.8 g DVB sorbent 37
  120 mL Isopropyl alcohol
  1,320 mL Glass fiber suspension 36
  Yield: Twenty four 200 mg 47 mm DVB SPE disks 30

Procedure

Assemble the tools and fixtures shown in FIG. 5 and provide a vacuum source and a suitable means to collect the waste water and waste water/alcohol mixtures generated by the manufacturing process. Prepare glass fiber suspension 36 as previously described. Weigh 4.8 g of DVB sorbent 37 into a suitable container such as a 2,000 mL beaker. Add 120 mL of isopropyl alcohol and stir to displace any air and thoroughly wet DVB sorbent 37. Next add 1,320 mL of glass fiber suspension 36 and stir until thoroughly mixed. A 1,000 mL beaker should be filled with 800 mL to 900 mL of glass fiber suspension 36. Both beakers should be clearly labeled. Fill a plastic laboratory squirt bottle with the same pH 2.0 to 2.2 water used to prepare suspension 36.

Place 50 mm glass fiber filter paper 44 into recess 62 of disk forming mold 51 as shown in FIG. 11. Next, blunt end 58A of cylindrical tool 58 is used to push filter paper 44 into cavity 59A of disk forming mold 51 until filter paper 44 sits on top of screen 50. Screen 50 sits directly on base 70. Stop 58C of cylindrical tool 58 should not limit the insertion depth of blunt end 58A. When inserted into cavity 59A of mold 51, filter paper 44 folds much like a pleated coffee filter into a cup like shape as shown in FIG. 12.

Apply vacuum and wet filter paper 44 with pH 2.0 to 2.2 water using the squirt bottle. Next, while still applying vacuum, add a 60 mL aliquot of glass fiber and sorbent suspension 38 into cavity 59A to form glass fiber and sorbent layer 42. This step is shown in FIG. 13A. Note that outer section 44B of filter paper 44 will only extend to the top of layer 42. Next, continue to apply vacuum and add a 30 mL aliquot of glass fiber suspension 36 to cavity 59A of mold 51 to form layer 40. After all the free liquid has been substantially removed insert blunt end 58A of cylindrical tool 58 into cavity 59A to compress side 32 and smooth out the edge of top surface 34 of SPE disk 30. FIG. 17 depicts SPE disk 30 as shown in FIG. 2 while still in mold 51. Next, remove mold 51 from plug 54. Insert a dowel or similar tool into cavity 59B of mold 51 to force screen 50 (and SPE disk 30) up and remove SPE disk 30 from mold 51 separating disk 30 from screen 50. Place SPE disk 30 on a suitable surface and allow SPE disk 30 to dry. If temperatures above room temperature are employed to facilitate the drying process the temperature limit of sorbent 37 must not be exceeded.

FIG. 3 SPE Disk 30 Example:

The disk depicted in FIG. 3 could be prepared using a variety of different sorbents, thicknesses and diameters. One possible example is a 47 mm diameter disk prepared with the following composition.

Materials
  Glass fiber suspension 36
  HLB (hydrophilic-lipophilic balanced) sorbent 37
  Isopropyl alcohol
  Filter paper 44 with a diameter of 55 mm
  Composition of glass fiber and sorbent suspension 38
  12.0 g HLB sorbent 37
  120 mL Isopropyl alcohol
  1,310 mL Glass fiber suspension 36
  Yield: Twenty four 500 mg 47 mm HLB SPE disks 30

Procedure

Assemble the tools and fixtures shown in FIG. 5 and provide a vacuum source and a suitable means to collect the waste water and waste water/alcohol mixtures generated by the manufacturing process. Prepare glass fiber suspension 36 as previously described. Weigh 12.0 g of HLB sorbent 37 into a suitable container such as a 2,000 mL beaker. Add 120 mL of isopropyl alcohol and stir to displace any air and thoroughly wet HLB sorbent 37. Next add 1,310 mL of glass fiber suspension 36 and stir until thoroughly mixed. A 1,000 mL beaker should be filled with 800 mL to 900 mL of glass fiber suspension 36. Both beakers should be clearly labeled. Fill a plastic laboratory squirt bottle with the same pH 2.0 to 2.2 water used to prepare suspension 36.

Place 55 mm glass fiber filter paper 44 into recess 62 of disk forming mold 51 as shown in FIG. 11. Next, blunt end 58A of cylindrical tool 58 is used to push filter paper 44 into cavity 59A of disk forming mold 51 until filter paper 44 sits on top of screen 50. Screen 50 sits directly on base 70. Stop 58C of cylindrical tool 58 should not limit the insertion depth of blunt end 58A. When inserted into cavity 59A of mold 51, filter paper 44 folds much like a pleated coffee filter into a cup like shape as shown in FIG. 12.

Apply vacuum and wet filter paper 44 with pH 2.0 to 2.2 water using the squirt bottle. Next, while still applying vacuum, add a 60 mL aliquot of glass fiber and sorbent suspension 38 into cavity 59A to form glass fiber and sorbent layer 42. This step is shown in FIG. 13. Next, continue to apply vacuum and add a 30 mL aliquot of glass fiber suspension 36 to cavity 59A of mold 51 to form layer 40. After all the free liquid has been substantially removed insert blunt end 58A of cylindrical tool 58 into cavity 59A to compress side 32 and smooth out the edge of top surface 34 of SPE disk 30. FIG. 16 depicts SPE disk 30 as shown in FIG. 3 while still in mold 51.

Next, remove mold 51 from plug 54. Insert a dowel or similar tool into cavity 59B of mold 51 to force screen 50 (and SPE disk 30) up and remove SPE disk 30 from mold 51 separating disk 30 from screen 50. Place SPE disk 30 on a suitable surface and allow SPE disk 30 to dry. If temperatures above room temperature are employed to facilitate the drying process the temperature limit of sorbent 37 must not be exceeded.

FIG. 4 SPE Disk 30 Example:

The disk depicted in FIG. 4 could be prepared using a variety of different sorbents, thicknesses and diameters. One possible example is a 47 mm diameter disk prepared with the following composition.

Materials
  Glass fiber suspension 36
  C-18 (Silica with an octadecyl surface modification) sorbent 37
  Isopropyl alcohol
  Filter paper 44 with a diameter of 60 mm
  Composition of glass fiber and sorbent suspension 38
  24.0 g C-18 sorbent 37
  180 mL Isopropyl alcohol
  1,240 mL Glass fiber suspension 36
  Yield: Twenty four 1,000 mg 47 mm C-18 SPE disks 30

Procedure

Assemble the tools and fixtures shown in FIG. 5 and provide a vacuum source and a suitable means to collect the waste water and waste water/alcohol mixtures generated by the manufacturing process. Prepare glass fiber suspension 36 as previously described. Weigh 24.0 g of C-18 sorbent 37 into a suitable container such as a 2,000 mL beaker. Add 180 mL of isopropyl alcohol and stir to displace any air and thoroughly wet C-18 sorbent 37. Next add 1,240 mL of glass fiber suspension 36 and stir until thoroughly mixed. A 1,000 mL beaker should be filled with 800 mL to 900 mL of glass fiber suspension 36. Both beakers should be clearly labeled. Fill a plastic laboratory squirt bottle with the same pH 2.0 to 2.2 water used to prepare suspension 36.

Place 60 mm glass fiber filter paper 44 into recess 62 of disk forming mold 51 as shown in FIG. 11. Next, blunt end 58A of cylindrical tool 58 is used to push filter paper 44 into cavity 59A of disk forming mold 51 until filter paper 44 sits on top of screen 50. Screen 50 sits directly on base 70. Stop 58C of cylindrical tool 58 should not limit the insertion depth of blunt end 58A. When inserted into cavity 59A of mold 51, filter paper 44 folds much like a pleated coffee filter into a cup like shape as shown in FIG. 12.

Apply vacuum and wet filter paper 44 with pH 2.0 to 2.2 water using the squirt bottle. Next, while still applying vacuum, add a 60 mL aliquot of glass fiber and sorbent suspension 38 into cavity 59A to form glass fiber and sorbent layer 42. This step is shown in FIG. 13. While maintaining vacuum, insert angled end 58B of cylindrical tool 58 into cavity 59A. Stop 58C of cylindrical tool 58 should limit the insertion depth of angled end 58B so that outermost section 44C of filter paper 44 is pulled away from the wall of cavity 59A but glass fiber and sorbent layer 42 is not disturbed and outer section 44B of filter paper 44 remains up against the wall of cavity 59A. Next blunt end 58A of cylindrical tool 58 can be inserted into cavity 59A to further fold outermost section 44C so that it rests directly on top of layer 42. Stop 58C should not be limiting the insertion depth of blunt end 58A. This action also serves to correct any minor deformity created in glass fiber and sorbent layer 42 as a result of the insertion of angled end 58A of cylindrical tool 58. This is shown in FIG. 14.

Next, continue to apply vacuum and add a 30 mL aliquot of glass fiber suspension 36 to cavity 59A of mold 51 to form layer 40. After all the free liquid has been substantially removed insert blunt end 58A of cylindrical tool 58 into cavity 59A to compress side 32 and smooth out the edge of top surface 34 of SPE disk 30. FIG. 15 depicts SPE disk 30 as shown in FIG. 4 while still in mold 51.

Next, remove mold 51 from plug 54. Insert a dowel or similar tool into cavity 59B of mold 51 to force screen 50 (and SPE disk 30) up and remove SPE disk 30 from mold 51 separating SPE disk 30 from screen 50. Place SPE disk 30 on a suitable surface and allow SPE disk 30 to dry. If temperatures above room temperature are employed to facilitate the drying process the temperature limit of sorbent 37 must not be exceeded.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A solid phase extraction disk, configured to separate dissolved chemicals, suspended solids and particles from a fluid; the solid phase extraction disk comprising:
  an upper cylindrical layer;

a middle cylindrical layer, arranged beneath the upper cylindrical layer, a portion of the middle cylindrical layer contacting the upper cylindrical layer;

a bottom circular layer, arranged beneath the middle cylindrical layer and extending upward along a perimeter of the middle cylindrical layer, edges of the bottom circular layer folded over a top surface of the middle cylindrical layer to cover only a portion of the top surface of the middle cylindrical layer;

wherein the upper cylindrical layer, the middle cylindrical layer, and the bottom circular layer are configured to separate dissolved chemicals, suspended solids and particles from a fluid passing through the upper cylindrical layer, the middle cylindrical layer, and the bottom circular layer;

wherein the upper cylindrical layer further comprises a first wet-laid glass fiber;

wherein the middle cylindrical layer further comprises a second wet-laid glass fiber and at least one sorbent; and wherein the bottom circular layer is made from a glass fiber mesh or a filter paper.

2. The solid phase extraction disk of claim 1, wherein bottom circular layer surrounds at least some of the perimeter of the middle cylindrical layer.

3. The solid phase extraction disk of claim 1, wherein bottom circular layer surrounds the perimeter of the middle cylindrical layer and at least some of a second perimeter of the upper cylindrical layer.

4. The solid phase extraction disk of claim 1, wherein bottom circular layer surrounds the perimeter of the middle cylindrical layer and extends in between the middle cylindrical layer and the upper cylindrical layer.

5. The solid phase extraction disk of claim 1, wherein the portion of the bottom circular layer extending upward along the perimeter of the middle cylindrical layer is pleated.

6. The solid phase extraction disk of claim 1, wherein the middle cylindrical layer has a diameter of 47 mm.

7. The solid phase extraction disk of claim 6, wherein the bottom circular layer has a diameter of 55 mm.

8. The solid phase extraction disk of claim 6, wherein the bottom circular layer has a diameter of 60 mm.

9. The solid phase extraction disk of claim 4, wherein the bottom circular layer includes an outermost ring section that extends in between the middle cylindrical layer and the upper cylindrical layer, a radial inner edge of the outermost ring section located proximate to a peripheral edge of the middle circular layer and radially outward of a center point of the middle cylindrical layer.

10. An assembly, comprising:
a housing comprising:
a first portion defining an internal volume, and
a second portion inserted through a first end of the first portion part way into the internal volume; and
the solid phase extraction disk of claim 1, the solid phase extraction disk being inserted through a second end of the first portion into the internal volume such that the bottom circular layer is disposed proximate to the second portion and a portion of the bottom circular layer is interposed between an inner surface of the first portion and an outer surface of the middle cylindrical layer.

11. The assembly of claim 10, further comprising a screen interposed between the bottom circular layer and the second portion of the housing.

12. The assembly of claim 10, wherein the second portion of the housing defines a passageway therethrough, the passageway configured to allow a vacuum to be exerted therethrough.

13. The assembly of claim 10, wherein:
the first portion includes a shelf projecting radially inward from an inner surface of the first portion into the internal volume defined by the first portion, the shelf disposed on a first axial surface of the second portion, the first axial surface being located within the inner volume defined by the first portion.

14. The assembly of claim 13, wherein the second portion includes a projection extending axially upward from an upper surface of the second portion into the internal volume such that a radial outer edge of the projection is located radially inward of an outermost radial edge of the second portion that is proximate to the inner surface of the first portion.

15. The assembly of claim 14, wherein a radial inner edge of the shelf is disposed radially outward of the radial outer edge of the projection such that a gap is present between the shelf and the projection, the gap configured for aspiration of the housing.

16. The assembly of claim 10, further comprising at least one seal member disposed between a radial outer surface of the second portion and a radial inner surface of the first portion.

17. The assembly of claim 16, wherein the second portion defines at least one groove on the radial outer surface thereof, the at least one seal member disposed in a corresponding one of the at least one groove.

* * * * *